United States Patent
Han et al.

(10) Patent No.: US 11,537,635 B2
(45) Date of Patent: Dec. 27, 2022

(54) HADOOP OLAP ENGINE

(71) Applicant: eBay Inc., San Jose, CA (US)

(72) Inventors: Luke Qing Han, Shanghai (CN); Xu Jiang, Shangahi (CN); Song Yi, Shanghai (CN); Chauncey Li, Shanghai (CN)

(73) Assignee: eBay Inc., San Jose, CA (US)

( * ) Notice: Subject to any disclaimer, the term of this patent is extended or adjusted under 35 U.S.C. 154(b) by 30 days.

(21) Appl. No.: 16/419,505

(22) Filed: May 22, 2019

(65) Prior Publication Data

US 2019/0324975 A1 Oct. 24, 2019

Related U.S. Application Data

(63) Continuation of application No. 14/320,607, filed on Jun. 30, 2014, now Pat. No. 10,353,923.

(60) Provisional application No. 61/983,878, filed on Apr. 24, 2014.

(51) Int. Cl.
*G06F 16/28* (2019.01)
*G06F 16/185* (2019.01)
*G06F 16/25* (2019.01)
*G06F 16/2458* (2019.01)

(52) U.S. Cl.
CPC .......... *G06F 16/283* (2019.01); *G06F 16/185* (2019.01); *G06F 16/2471* (2019.01); *G06F 16/254* (2019.01)

(58) Field of Classification Search
CPC .................................................. G06F 16/283
See application file for complete search history.

(56) References Cited

U.S. PATENT DOCUMENTS

| 6,684,206 | B2 | 1/2004 | Chen et al. | |
|---|---|---|---|---|
| 8,732,118 | B1 | 5/2014 | Cole et al. | |
| 8,938,416 | B1 | 1/2015 | Cole et al. | |
| 10,353,923 | B2 | 7/2019 | Han et al. | |
| 2004/0122844 | A1 | 6/2004 | Malloy et al. | |
| 2004/0260671 | A1* | 12/2004 | Potter | G06F 16/283 |
| 2005/0177553 | A1* | 8/2005 | Berger | G06F 16/283 |
| 2005/0283488 | A1* | 12/2005 | Colossi | G06F 16/283 |

(Continued)

FOREIGN PATENT DOCUMENTS

| CN | 101183368 A | 5/2008 |
|---|---|---|
| CN | 102207940 A | 10/2011 |

(Continued)

OTHER PUBLICATIONS

Leberknight, "Handling Big Data with HBase Part 3: Architecture Overview", Dec. 17, 2013 (Year: 2013).*

(Continued)

*Primary Examiner* — Dawaune A Conyers
(74) *Attorney, Agent, or Firm* — FIG. 1 Patents

(57) ABSTRACT

In various example embodiments, systems and methods for building data cubes to be stored in a cube store are presented. In some embodiments, a metadata engine generates the cube metadata. In further embodiments, cube data is generated by a cube build engine based on the cube metadata and source data. The cube build engine performs a multi-stage MapReduce job on the source data to produce a multi-dimensional cube lattice having multiple cuboids. In further embodiments, the cube data is provided to the cube store.

20 Claims, 36 Drawing Sheets

(56) References Cited

U.S. PATENT DOCUMENTS

| | | | |
|---|---|---|---|
| 2006/0047622 A1* | 3/2006 | Folkert | G06F 16/24535 |
| 2007/0022120 A1* | 1/2007 | Huang | G06F 16/24552 |
| 2009/0287666 A1 | 11/2009 | Dekimpe et al. | |
| 2010/0250412 A1* | 9/2010 | Wagner | G06F 16/2477 |
| | | | 705/31 |
| 2012/0179643 A1 | 7/2012 | Chaki et al. | |
| 2014/0279853 A1* | 9/2014 | Grondin | G06F 16/285 |
| | | | 707/609 |
| 2015/0310082 A1 | 10/2015 | Han et al. | |

FOREIGN PATENT DOCUMENTS

| | | |
|---|---|---|
| CN | 105488231 A | 4/2016 |
| CN | 106600067 A | 4/2017 |
| WO | 2018/209594 A1 | 11/2018 |

OTHER PUBLICATIONS

Applicant Initiated Interview Summary received for U.S. Appl. No. 14/320,607 dated Nov. 28, 2016, 3 pages.

Applicant Initiated Interview Summary Received for U.S. Appl. No. 14/320,607 dated May 2, 2018, 3 pages.

Final Office Action Received for U.S. Appl. No. 14/320,607 dated Jan. 26, 2017, 19 pages.

Final Office Action received for U.S. Appl. No. 14/320,607, dated Mar. 13, 2018, 26 pages.

Non-Final Office Action received for U.S. Appl. No. 14/320,607, dated Jun. 13, 2016, 18 pages.

Non-Final Office Action received for U.S. Appl. No. 14/320,607, dated Jun. 28, 2017, 21 pages.

Non-Final Office Action received for U.S. Appl. No. 14/320,607, dated Jul. 27, 2018, 23 pages.

Notice of Allowance Received for U.S. Appl. No. 14/320,607 dated Mar. 8, 2019, 8 pages.

Response to Final Office Action Filed on Apr. 24, 2017 for U.S. Appl. No. 14/320,607 dated Jan. 26, 2017, 12 pages.

Response to Final Office Action filed on May 9, 2018, for U.S. Appl. No. 14/320,607, dated Mar. 13, 2018, 22 pages.

Response to Non-Final Office Action filed on Dec. 6, 2016, for U.S. Appl. No. 14/320,607, dated Jun. 13, 2016, 10 pages.

Response to Non-Final Office Action filed on Nov. 27, 2017, for U.S. Appl. No. 14/320,607, dated Jun. 28, 2017, 17 pages.

Response to Non-Final Office Action filed on Nov. 27, 2018, for U.S. Appl. No. 14/320,607, dated Jul. 27, 2018, 17 pages.

International Search Report received for PCT Patent Application No. PCT/CN2017/084707, dated Feb. 23, 2018, 3 pages.

International Written Opinion Report received for PCT Patent Application No. PCT/CN2017/084707, dated Feb. 23, 2018, 3 pages.

International Report on Patentability received for PCT Application No. PCT/CN2017/084707, dated Nov. 28, 2019, 5 pages.

Kylin, et al., "Dive Into Apache Kylin Cube and Query Optimization", Google Search, Accessed on Jul. 23, 2018, 2 pages.

Cerin, et al., "Grade De Docteur", 2010, 188 pages.

Nambiar, et al., "Performance Characterization and Benchmarking", Feb. 5, 2014, pp. 93-108.

Haque, et al., "A MapReduce Approach to NoSQL RDF Databases", 2013.

* cited by examiner

- GET A CUBOID  ╭─ 401

| QUERY A CUBOID |
  |---|
  | select cal_id, cat_id, count(*), sum(price) <br> from item <br> inner join calendar on item.cal_id = calendar.id <br> inner join category on item.cat_id - category.id <br> group by cal_id, cat_id |

- 2-D SLICE CUBOID  ╭─ 402

| 2-D SLICE CUBOID |
  |---|
  | SELECTcal.cal_dt <br>      ,cat.META_CATEG_NAME <br>      ,count(*) as lstg_count <br>      ,sum(i.qty_sold) as sold_item <br> FROM     access_Views.dw_lstg_item i <br> INNER JOIN access_views.dw_cal_dt cal <br>     ON  i.auct_end_dt = cal.cal_dt <br> INNER JOIN access_views.dw_category_groupings cat <br>     ON  i.item_site_id=cat.site_id <br>     AND  i.leaf_categ_id=cat.leaf_categ_id <br> WHERE  i.auct_end_dt = '2013-01-06' <br> GROUP  BY cal_dt ,meta_mateg_name |

3-D CUBOID

```
SELECT
            ,cat.META_CATEG_NAME
            ,i.ITEM_SITE_ID
            ,count(*) as live_lstg_cnt
FROM        access_views.dw_lstg_item i
INNER JOIN  access_views.dw_cal_dt cal
       ON   i.auct_end_dt > cal.cal_date
       AND  i.auct_start_dt <= cal.cal_date
INNER JOIN  access_views.dw_category_groupings cat
       ON   i.item_site_id=cat.site_id
       AND  i.lead_categ_id=cat.leaf_categ_id
WHERE cal.cal_date between '2013-01-06' and '2013-01-12'
   AND i.auct_type_code in (1,7,9)
   AND i.item_site_id in (0,100,3,77)
GROUP BY week_beg_dt,meta_categ_name,item_site_id
```

404

3-D CUBOID

```
SELECT      cal.WEEK_BEG_DT
            ,cat.META_CATEG_NAME
            ,i.ITEM_SITE_ID
            ,count(*) as live_lstg_cnt
FROM        access_views.dw_lstg_item i
INNER JOIN  access_views.dw_cal_dt cal
       ON   i.auct_end_dt > cal.cal_date
       AND  i.auct_start_dt <= cal.cal_date
INNER JOIN  access_views.dw_category_groupings cat
       ON   i.item_site_id=cat.site_id
       AND  i.leaf_categ_id=cat.leaf_categ_id
WHERE cal.cal_date between '2013-01-06' and '2013-01-12'
   AND i.auct_type_code in (1,7,9)
   AND i.item_site_id in (0,100,3,77)
GROUP BY week_beg_dt,meta_categ_name,item_site_id
```

FIG. 4D

HBase MAPPING  421

```
{
        "id": "2",                   422
        "name": "star_item_cube",
        "status": "active",
        "fact_table":{               423
               "name": "item",
               "type":"fact",
               "database":"edw"
        },
        "dimensions": [   424
    {
                       "id": "1",
                       "name": "calendar",
    "dataType":"hierachry",
    "lookup_table" : {
    "name": "calendar",
                                 "type": "lookup",
    "database":edw"
   },
        "join": {
        "primaryKey": "id",
        "foreignKey":["calendar_id"]
        },
        "hierarchy": [
                        {
        "level": "1",
                       "name": "year",
    "dataType":"string"
                },
    {
        "level": "2",
                       "name": "month",
    "dataType": "string"
                },
    {
        "level": "3",
                       "name": "day",
    "dataType":"string"
                }
    ]
          },
          {
                "id": "2",
```

FIG. 4E

```
            "name": "site",
        "dataType":"string",
        "lookup_table" : {
        "name": "site",
                    "type": "lookup",
        "database":"edw"
    },
    "join": {
    "primaryKey": "id",
    "foreignKey": ["site_id"]
   }
        },
{
            "id": "3"
            "name": "category",
    "dataType":"String",
    "lookup_table" : {
    "name": "category",
                "type": "lookup",
    "database":"edw"
 },
            "join": {
  "primaryKey": "id",
  "foreignKey": [category_id]
 }
        }                425
    ],
    "measures": {
       {
            "id": "1",
            "name": "usdamtsum",
            "dataType":"double",
            "function":{
                    "expression":"sum",
                    "parameter": {
                            "type":"column",
                            "value":"usd_amt"
                    }
             }
        },
    {
```

FIG. 4F1

```
            "id": "2",
            "name": "itemcount",
            "dataType":"long",
            "function":{
                    "expression":"count",
                    "parameter": {
                            "type":"constant",
                            "value":"1"
                    }
            }
    }
],
"hbase_mapping": {
    "type": "full_materialization",
    "hbase_table":{
            "name":"sample_cube",
            "type":"hbase_table"
    "column_family": [
        {
                "name": "cf1",
                "columns": [
                    {
                            "qualifier":"usd_amt",
                            "measure_ref":"usdamtsum"
                    },
                    {
                            "qualifier":"item_count",
                            "measure_ref":"itemcount"
                    }]
        }
```

| user_id | year | site | category | item_id | usd_amt |
|---|---|---|---|---|---|
| u1 | 2010 | us | tech | 1001 | 15.09 |
| u2 | 2010 | us | tech | 1002 | 20.34 |
| u1 | 2011 | cn | baby | 1003 | 100.22 |
| u3 | 2012 | us | tech | 1004 | 10.87 |

| (year, site, category) |
|---|
| (year, *, *) |
| (*, site, *) |
| (*, *, category) |
| (year, site, *) |
| (year, *, category) |
| (*, site, category) |
| (*, *, *) |

| Field | Optional? | Data Type | Sample Value | Desc |
|---|---|---|---|---|
| id | no | int | 1 | Unique ID of cube |
| name | no | string | test_kylin_cube_with_sur | Unique name of cube |
| statue | no | string | active\|disable | Status of cube |

| Field | Optional? | Data Type | Sample Value | Default Value | Desc |
|---|---|---|---|---|---|
| name | no | String | test_kylin_fact | | Fact table name from source |
| type | yes | String | fact | fact | The only accepted value is "fact" |
| database | yes | String | edw | edw | Database name or schema. should keep same as Star Schema's database/schema name |

| Field | Optional? | Data Type | Sample Value | Default Value | Desc | | | | |
|---|---|---|---|---|---|---|---|---|---|
| dimensions | no | array | | | A set of dimensions of a cube | | | | |
| | Field | Optional? | Data Type | Sample Value | Default Value | Desc | | | |
| | id | no | int | 1 | | Sorted ID of cube's dimension | | | |
| | name | no | string | Category | | Name of a dimension in this cube | | | |
| | datatype | no | string | string[int]date | | Dimension return type, most of the case this type will keep same as the underline column/expression, but it should be any of the type available for dimension | | | |
| | datatype | no | | | | Dimension table relative to this dimension | | | |
| | | Field | Optional? | DataType | Sample Value | Default Value | Desc | | |
| | | name | no | string | test_category_groupings | | Table name of star Schema | | |
| | | type | yes | string | lookup | lookup | "Lookup" mean dimension table | | |
| | | column | yes | | | | Column relative to this dimension from dimension table. Note: in a dimension, only need and must have one of "column" or "hierarchy" definition | | |

FIG. 11D

| | Field | Optional? | Data Type | Sample Value | Default Value | Desc |
|---|---|---|---|---|---|---|
| | name | no | string | week_beg_dt | | Column name of dimension table. must matched |
| | datatype | no | string | string\|int\|date | | Data type from source metadata |
| hierarchy | yes | array | | | | Hierarchy dimension. Note: in a dimension, only need and must have one of "column" or "hierarchy" definition |
| | Field | Optional? | Data Type | Sample Value | Default Value | Desc |
| | name | no | string | week_beg_dt | | Column name of dimension table. must matched |
| | datatype | no | string | string\|int\|date | | Data type from source metadata |
| hierarchy | yes | array | | | | Hierarchy dimension. Note: in a dimension, only need and must have one of "column" or "hierarchy" definition |

FIG. 11E

| Field | Optional? | Data Type | Sample Value | Default Value | Desc | | | |
|---|---|---|---|---|---|---|---|---|
| type | no | string | inner | | Join type: inner, left, right | | | |
| primary_key | no | array | | | Join fields, Ordered both in PK and FK | | | |
| | | Field | Optional? | DataType | Sample Value | Default Value | Desc | |
| | | name | no | string | site_id | | Column name from dimension table, must matched | |
| foreign_key | no | array | | | Join fields. Ordered both in PK and FK | | | |
| | | Field | Optional? | DataType | Sample Value | Default Value | Desc | |
| | | name | no | string | lstg_site_id | | Column name from fact table. must matched | |

TODO:

| # | | |
|---|---|---|
| 1 | Combine Dimension | e.g. Name should combine the underline two fields: First Name and Last Name |
| 2 | Expression | e.g. Date convert, String Ops... |

| Field | Optional? | Data Type | Sample Value | Default Value | Desc | | | | | | | |
|---|---|---|---|---|---|---|---|---|---|---|---|---|
| measures | no | array | | | A set of measures of a cube | | | | | | | |
| | | Field | Optional? | Data Type | Sample Value | Default Value | Desc | | | | | |
| | | id | no | int | 1 | | Sorted ID of cube's measure | | | | | |
| | | name | no | string | GMV | | Measure name | | | | | |
| | | function | no | | | | How a measure will be calculated based on | | | | | |
| | | | | Field | Optional? | DataType | Sample Value | Default Value | Desc | | | |
| | | | | expression | no | string | sum\|count | | Function when aggregating based on dimensions | | | |
| | | | | returntype | no | string | int\|double\|decimal | | Return data type | | | |
| | | | | parameter | no | | | | | | | |
| | | | | | | Field | Optional? | Date Type | Sample Value | Default Value | Desc | |
| | | | | | | type | yes | string | column\|const | | Indicate the value is table field name or constant value | |
| | | | | | | value | no | string | price | | Field from fact table or constant value Note: All measure's columns must coming from Fact Table | |

| Field | Optional? | Data Type | Sample Value | Default Value | Desc |
|---|---|---|---|---|---|
| header_columns | yes | array | ["categ_lvl3_name"] | | A set of field names which will be placed in HEADER section of rowkey |
| header_length | yes | array | ["30"] | | A set of number of header field's length, must match header_columns |
| body_columns | no | array | ["categ_lvl3_name", "RTL_WEEK_BEG_DT"] | | A set of field names which will be placed in BODY section of rowkey |
| body_length | no | array | ["30", "10"] | | A set of number of body field's length, must match body_columns |
| aggregation_groups | no | array | ["meta_categ_name", "categ_lvl2_name", "categ_lvl3_name", "week_beg_dt"] | | expired? |

| Field | Optional? | Data Type | Sample Value | Desc |
|---|---|---|---|---|
| storage | | | | Currently field: hbase_mapping |

| Field | Optional? | Data Type | Sample Value | Desc |
|---|---|---|---|---|
| type | no | string | hbase\|redis | Underline storage type, HBase is the only one be support now |
| table | no | string | | Currently field: hbase_table |

| Field | Optional? | Data Type | Sample Value | Default Value | Desc |
|---|---|---|---|---|---|
| name | no | string | dict_test_kylin_cube_with_sur | | Unique table name of storage |
| type | no | string | hbase_table | | To Be Retire... |

| Field | Optional? | DataType | Sample Value | Default Value | Desc |
|---|---|---|---|---|---|
| name | no | string | f1 | | Unique column family name, keep minimum if possible to save storage space |
| columns | no | | | | |

| Field | Optional? | Date Type | Sample Value | Default Value | Desc |
|---|---|---|---|---|---|
| qualifier | no | string | m | | Unique column name, keep minimum if possible to save storage space |
| measure_refs | no | array | ["gmv","trans_cnt"] | | A set of measure names refer to "Measures" section Note: it's measure name, not the table column name |

FIG. 11I

```
                    CUBE METADATA JSON SAMPLE
{
    "id": "1",
    "name": "test_kylin_cube_with_alr",
    "status": "active",
    "fact_table": {
        "name":"test_kylin_fact",
        "type": "fact",
        "database": "adv"
    },
    "dimensions": [
      {
         "id", "1"
         "name": "week_beg_dt",
         "datatype", "string",
         "table", {
            "name": "test_cal_dt",
            "type": "lookup"
         },
         "column": {
            "name": "week_beg_dt",
            "datatype":"string"
         },
         "join": {
            "type": "inner",
            "primary_key": [
              {
                  "name": "cal_dt"
              }
            ],
            "foreign_key": [
              {
                  "name":"cal_dt"
              }
            ]
         ]
      }
    },
    {
        "id", "2",
        "name": "category",
        "table": {
          "name" : "test_category_groupings",
          "type": "lookup"
        },
        "join": {
          "type": "inner",
          "primary_key": [
                {
                    "name": "leaf_categ_id"
                },
                {
                    "name": "site_id"
                }
```

FIG. 11J

```
        ],
        "foreign_key": [
          {
                "name", "leaf_categ_id"
          },
          {
                "name": "lg_site_id"
          }
        ]
      },
      "hierarchy": [
        {
            "level": "1",
            "column": {
              "name": "meta_categ_name",
              "datatype": "string"
            }
        },
        {
            "level": "2",
            "column": {
              "name": categ_lvl2_name",
              "datatype": "string"
            }
        },
        {
            "level": "3",
            "column": {
              "name":"categ_lvl3_name",
              "datatype": "string"
            }
        }
      ]
    },
    {
    "id", "3",
    "name": "lstg_format_name",
    "datatype": "string",
    "table": {
      "name": "test_kylin_fact",
      "type": "fact"
    },
    "column": {
      "name": lstg_format_name",
      "datatype": "string"
    }
```

FIG. 11K

```
                    "join": {
                      "type": "inner",
                      "primary_key"{
                          {
                              "name": "site_id"
                          }
                      ],
                      "foreign_key": [
                          {
                              "name": "lstg_site_id"
                          }
                      ]
                    }
                },
                {
                    "id": "5",
                    "name": "seller_type_desc",
                    "datatype": "string",
                    "table": {
                      "name": "test_seller_type_dis",
                      "type": "lookup"
                    },
                    "column": {
                      "name": "seller_type_desc",
                      "datatype": "string"
                    },
                    "join": {
                      "type": "inner",
                      "primary_key": [
                          {
                              "name": "seller_type_cd"
                          }
                      ],
                      "foreign_key": [
                          {
                              "name": "slr_segment_cd"
                          }
                      ]
                    }
                },
                {
                    "id": "6",
                    "name": "seller_id",
                    "datatype": "string",
                    "table": {
                      "name": "test_kylin_fact",
                      "type": "fact"
                    },
                    "column": {
                      "name": "seller_id",
                      "datatype": "string"
                    }
                }
            ],
            "measures": [
                {
                    "id": "1",
                    "name": "gmv",
                    "function": {
```

FIG. 11L

```
                    "expression": "sum",
                    "returntype": "double",
                    "parameter": {
                      "type": "column",
                      "value": "price"
                    }
                }
            },
            {
                "id": "2",
                "name": "trans_cnt",
                "function": {
                    "expression": "count",
                    "returntype": "long",
                    "parameter":{
                        "type": "column",
                        "value": "item_count"
                    }
                }
            }
        ],
        "rowkey":{
        "header_columns":["seller_id"],
            "header_length":[18],
            "body_columns": [
         "week_beg_dt",
                "meta_categ_name",
                "categ_lvl2_name",
                "categ_lvl3_name",
                "lstg_format_name",
                "site_name",
                "seller_type_desc"
           ],
            "body_length": ["10","30","30","30","12","63","50"],
        "aggregation_groups": [
             ["meta_categ_name","categ_lvl2_name","categ_lvl3_name","week_beg_dt"]
        ]
        },
        "hbase_mapping": {
            "type":"full_materialization",
            "hbase_table": {
                "name": "dict_test_kylin_cube_withalr",
                "type": "hbase_table"
            },
            "column_family": [
              {
                "name": "fi",
                "columns": [
                    {
                      "qualifier": "m",
                      "measure_refs": [
                          "gmv",
                          "trans_cnt"
                      ]
                    }
                ]
              }
            ]
        }
```

METADATA MATRIX:

| Name | Optional? | Data Type | Sample Value | Desc |
|---|---|---|---|---|
| id | No | Int | 1 | Unique Table ID |
| Name | No | String | test_kylin_fact | Unique Table Name (Database Scope) |
| database | No | String | edw | Unique Database Name |
| Columns | No | Array | | |

| | Name | Optional | Data Type | Sample Value | Desc |
|---|---|---|---|---|---|
| | id | No | Int | 1 | Unique Column ID (Table Scope) |
| | name | No | String | TRANS_ID | Unique Column Name (Table Scope) |
| | datatype | No | String | string\|long\|short\|int\|decimal\|double\|date\|timestamp | Data Type, All lower case |

FIG. 11N

```
                    ┌─1157
┌─────────────────────────────────────────────┐
│           SOURCE TABLE JSON SAMPLE          │
├─────────────────────────────────────────────┤
{
    "id": "1",
    "name": "test_kylin_fact",
    "database": "edw",
    "columns": [
      {
         "id", "1",
         "name":"TRANS_ID",
         "datatype":"long"
      },
      {
         "id":"2",
         "name":"cal_dt",
         "datatype":"string"
      },
      {
         "id":"3",
         "name","LSTG_FORMAT_NAME",
         "datatype":"string"
      },
      {
         "id":"4"
         "name":"LEAF_CATEG_ID",
         "datatype":"double"
      },
      {
         "id":"5",
         "name": "LSTG_SITE_ID",
         "datatype":"int"
      },
      {
         "id":"6",
         "name":"SLR_SEGMENT_CD",
         "datatype":"short"
      },
      {
         "id":"7",
         "name":"PRICE",
         "datatype":"decimal"
      },
   {
         "id":"8",
         "name":"ITEM_COUNT",
         "datatype":"long"
      }
   ]
}
```

FIG. 11O

HADOOP OLAP ENGINE

CROSS-REFERENCE TO RELATED APPLICATIONS

This application claims the benefit of U.S. Provisional Application No. 61/983,878, filed Apr. 24, 2014, entitled "HADOOP OLAP ENGINE," which is incorporated herein by reference in its entirety.

TECHNICAL FIELD

Embodiments of the present disclosure relate generally to analytical processing, and more particularly, but not by way of limitation, to online analytical processing to generate business intelligence information.

BACKGROUND

Online Analytical Processing (OLAP) is a technology that is used to organize large businesses databases and support business intelligence (BI). The online analytical processing generally requires pre-computation and storage of information in a data cube, which also may be referred to as an OLAP data cube. The multidimensional expressions (MDX) language may provide a specialized syntax for querying and manipulating the multidimensional data stored in the data cube. For example, a company might wish to summarize financial data by product, by time-period, and by city to compare actual and budget expenses. In this example, the product, time, city, and scenario (actual and budget) are the data's dimensions. Various other dimensions may be used in the data cubes.

The data cubes may be described as a multidimensional data set with an arbitrary number of dimensions. In general, each cell of the data cube may contain a number that represents some measure of a business, such as sales, profits, expenses, budget and forecast. The data cube data may be stored in a star schema or snowflake schema in a relational data warehouse or in a special-purpose data management system.

The BI tools may be used by companies to facilitate enhanced business decisions through reporting, analysis, and monitoring. The data cubes may be used as a form of caching to allow multiple reports to be stored in the data cubes. In various embodiments, the result is almost instant report execution regardless of the report size. The data cube can be created generically in order to serve as a cache for a number of different reports.

Many BI tools and services available may have limitations such as: (1) a single file storage with less than two billion rows per data cube; (2) ability to only scale-up with no distributed architecture; and (3) amount of time needed to run a query is over 24 hours. As more and more analysis data is available on Hadoop clusters, data consumers are requesting that such analysis data on Hadoop interface directly with BI platforms. Hadoop, also referred to as Apache Hadoop, is an open-source software framework for storage and large-scale processing of data-sets on clusters of commodity hardware. Hadoop is an Apache top-level project and licensed under Apache License 2.0. The Apache Hadoop framework includes Hadoop Distributed File System (HDFS) and the Hadoop MapReduce, as well as other components.

BRIEF DESCRIPTION OF THE DRAWINGS

Various ones of the appended drawings merely illustrate example embodiments of the present disclosure and cannot be considered as limiting its scope.

FIGS. 4C and 4D illustrate an example of an SQL query used to access data from the cube data, according to one embodiment.

FIGS. 4E and 4F1-4F2 illustrate a full materialization schema for an HBASE schema design, according to an example embodiment.

FIG. 7A illustrates a fact table having three dimensions, according to one embodiment.

FIG. 7B illustrates eight cuboids corresponding to the fact table shown in FIG. 7A.

FIG. 11B illustrates an example chart of the basic cube information, according to one embodiment.

FIG. 11C illustrates a fact table using a star schema data model, according to an example embodiment.

FIGS. 11D-11F illustrate dimension information for a cube, according to an example embodiment.

FIG. 11G illustrates example measurement information for a cube, according to one embodiment.

FIG. 11H illustrates an example of the rowkey information for a cube, according to one embodiment.

FIG. 11I illustrates an example of the storage information for a cube, according to one embodiment.

FIGS. 11J-11M illustrate a JSON example of cube metadata, according to one embodiment.

FIG. 11N illustrates an example metadata matrix, according to one embodiment.

FIG. 11O illustrates an example JSON source table file for storing metadata, according to one embodiment, according to one embodiment.

DETAILED DESCRIPTION

Figure 1:
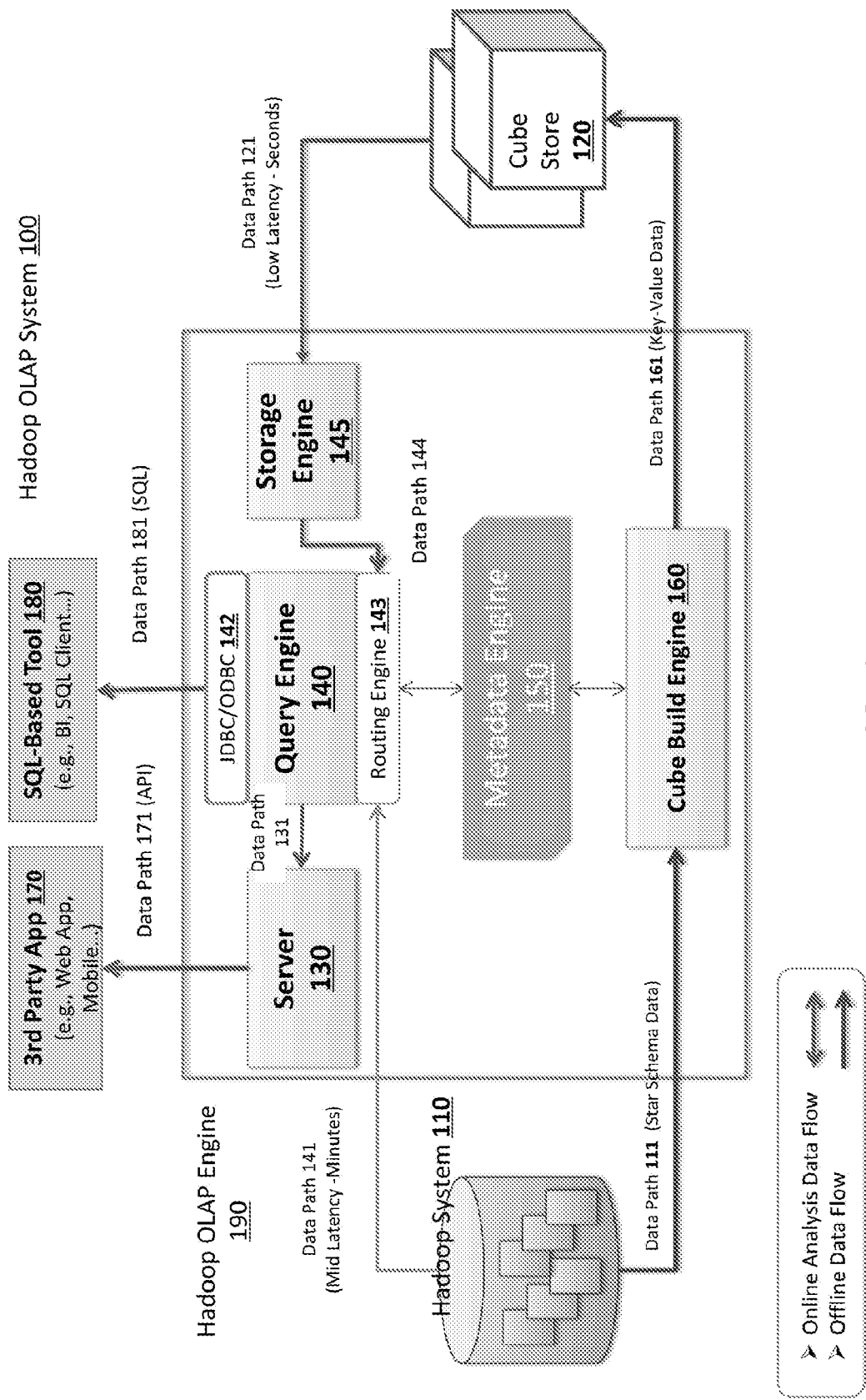
FIG. 1 illustrates a block diagram of a Hadoop OLAP system 100, according to one embodiment.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a marketplace environment, the embodiments are given merely for clarity in disclosure. Thus, any type of electronic publication, electronic commerce, social networking, or electronic business system and method, including various system architectures, may employ various embodiments of the system and method described herein and may be considered as being within a scope of example embodiments. Each of a variety of example embodiments is discussed in detail below.

In example embodiments, a Hadoop system, which includes an HDFS, may be used to store huge amounts of data with mostly sequential access. On the other hand, a cube store, such as an HBase cube store, provides fast random access to data. The HBase cube store refers to storing cube data on an HBase. The HBase, also referred to as the Apache HBase or the Hadoop database, is an open source, non-relational, distributed, scalable, big data store developed as part of the Apache Hadoop project. The HBase runs on top of HDFS and allows random, real-time read/write access to big data (large and complex collections of data sets). The cube data refers to a multidimensional dataset with each cell of the cube holding a number that represents some measure (for example, a measure of the business, such as sales, profits, expenses, budget and forecast). A Hadoop OLAP engine, receives source data from the Hadoop system, and builds cubes to be stored in the cube store for fast access to the cube data. The cubes built by the Hadoop OLAP engine may be OLAP cubes representing an array of data understood in terms of its 0 or more dimensions which may be used for analyzing business data in the search for business intelligence.

In other example embodiments, systems and methods for building cubes to be stored in a cube store are described. The source data (represented by star schema data) for building the cubes may be provided by a Hadoop system. A Hadoop OLAP engine may be used to build a cube by performing a multi-stage MapReduce job on the source data to produce a multi-dimensional cube lattice having multiple cuboids. The cube metadata, including dimension and measure information, is used by the Hadoop OLAP engine to generate the cube data. The cube data may be uploaded into cube tables in the cube store. In one example embodiment, the cube store is an HBase data cube.

In further embodiments, systems and methods for querying cube data from cube stores are described. In an example embodiment, a user may query a cube store using a BI Tool to access BI information (e.g., BI reports, charts, and other data). The query may be an SQL query which is converted to a cube query to access one or more cube tables stored in the cube store. The cube data may represent business, financial, and other data may be used to generate or produce BI information in response to the online request from the BI Tools.

Example OLAP System

FIG. 1 illustrates a block diagram Hadoop OLAP system 100, according to an example embodiment. The Hadoop OLAP system 100 includes a Hadoop system 110, a cube store 120, and a Hadoop OLAP engine 190, which includes a server 130, a query engine 140, a storage engine 145, a metadata engine 150, and a cube build engine 160. The Hadoop system 110 may include one or more Hadoop clusters. The data store 120 may be used to implement an OLAP data cube. In an example embodiment, the data store 120 may be an HBase data cube. The data store 120 includes tables for storing cube data. In an example embodiment, a user may query the Hadoop OLAP system 100 to access BI information. The BI information may be presented to the user through the BI tools.

The Hadoop system 110 provides both distributed storage and computational capabilities. The Hadoop system 110 includes: a MapReduce for computational capabilities representing a computation engine; a Hadoop distributed file system (HDFS) for storage; and a server cloud that runs on commodity hardware. The Hadoop system 110 is a distributed master-slave architecture having a master node and slave nodes. The HDFS and MapReduce are both built of clients, slaves, and a coordinating master. The coordinating masters in the HDFS are referred to as the NameNode and DataIlode. The coordinating masters in MapReduce are referred to as jobtracker and tasktrackers. In one example, a master node includes a MapReduce master, which is responsible for organizing where computational work should be scheduled on the slave nodes, and a HDFS master, which is responsible for partitioning the storage across the slave nodes and keeping track of where data is located. In example embodiments, slave nodes may be increased for increased storage and processing capabilities.

For an example embodiment, commodity hardware refers to mid-level rack servers with dual sockets, error-correcting random-access memory (RAM), and serial advanced technology attachment (SATA) drives optimized for RAID storage. Using RAID, however, is strongly discouraged on the DataIlodes, because HDFS already has replication and error-checking built-in, but using RAID on the NameNode is strongly recommended for additional reliability. The storage and computational capabilities of the Hadoop system 110 scale with the addition of hosts to a Hadoop cluster and can reach volume sizes of petabytes on clusters with thousands of hosts.

The HDFS is optimized for high throughput and works best when reading and writing large files (gigabytes and larger). The HDFS leverages unusually large (for a filesystem) block sizes and data locality optimizations to reduce network input/output (I/O). Scalability and availability are key traits of the HDFS, and are achieved in part due to data replication and fault tolerance. The HDFS replicates files for a configured number of times, is tolerant of both software and hardware failures, and automatically re-replicates data blocks on nodes that have failed. The logical components of the HDFS include the NameNode and DataIlode.

In an example embodiment, an HDFS client communicates with the NameNode for metadata-related activities, and to DataNodes to read and write files. The HDFS NameNode keeps in memory the metadata about the filesystem, such as which DataNodes manage the blocks for each file. The DataNodes communicate with each other for pipeline file and reads and writes. Files are made up of blocks, and each file can be replicated multiple times, meaning there are many identical copies of each block for the file, which by default are three copies.

The MapReduce is a batch-based, distributed computing framework. For example, it may allow parallel processing over a large amount of raw data, such as combining web logs with relational data from an OLAP database to model how a user interacts with a website. The MapReduce model simplifies parallel processing by abstracting away the complexities involved in working with distributed systems. The role of a programmer is to define a map and reduce functions, where the map function outputs key/value tuples, which are processed by reduce functions to produce the final output. In operation, a client submits a MapReduce job, which is received by a Hadoop master. The Hadoop master de-composes the job into map and reduce tasks, and schedules them for remote execution on the slave nodes.

The map function takes as input a key/value pair, which represents a logical record from the input data source. In the case of a file, this could be a line, or it could be a row if the input source is a table in a database. The map functions produce zero or more output key/value pairs for that one input pair. For example, if the map function is a filtering map function, it may only produce output if a certain condition is met. Or the map function could be performing a de-multiplexing operation, where a single input key/value yields multiple key/value output pairs.

The shuffle and sort phases, which occur between the map output and the reduce input, are responsible for two functions: determining the reducer that should receive the map output key/value pair (called partitioning); and ensuring that, for a given reducer, all its input keys are sorted. The reduce function is called once per unique map output key.

The reduce function can also output zero to many key/value pairs. The reducer output can be written to flat files in HDFS, can insert/update rows in a NoSQL database, or write to any data sink, depending on the requirements of the job.

Moving data in and out of Hadoop system 110 may be referred to as data ingress and egress and represents the process by which data is transported from an external system into Hadoop system 110, and vice versa. Hadoop system 110 supports ingress and egress at a low level in HDFS and MapReduce. Files may be moved in and out of HDFS, and data may be pulled from external data sources and pushed to external data sinks using MapReduce. For example embodiments, Hadoop system 110 data sources may include log data, files, HBase/NoSQL data, and OLTP data. The log data (including log collectors) and files (including file ingress) may be transported to HDFS. The data stored in HBase/NoSQL and/or OLTP may be transported to MapReduce. In further embodiments, data may be transported out of the Hadoop system 110 from HDFS to files, and transported out of the Hadoop system 110 from MapReduce to be stored in HBase/NoSQL and/or OLTP/OLAP databases.

The cube store 120 is a distributed column-oriented database built on top of the HDFS in an example embodiment. The cube store 120 may be an HBase data cube with a Hadoop application capable of real-time read/write random access to very large datasets. The cube store 120 scales linearly by adding nodes. The cube store 120 may not relational and may not support SQL. The cube store 120 may host very large, sparsely populated tables on clusters made from commodity hardware.

The data cube 120 provides multidimensional storage and is designed for high performance and high availability. The main focus of the cube store 120 is on Create, Read, Update, and Delete (CRUD) operations on wide sparse tables. Similar to the HDFS, the cube store 120 implements a master/slave architecture. In example embodiments, the cube store 120 may leverage the HDFS for its persistent data storage. This allows the cube store 120 to leverage many advanced features that the HDFS provides, including checksums, replication, and failover. The data management of the cube store 120 may be implemented by distributed region servers, which are managed by a cube store master. In an example embodiment, the cube store master node is responsible for orchestrating a cluster of one or more region server slaves. The cube store master is responsible for bootstrapping a virgin install, for assigning regions to registered region servers, and for recovering region server failures. The master node may be lightly loaded while the region servers may carry zero or more regions and may field client read/write requests. The region servers may also manage region splits, informing the cube store 120 master about new daughter regions.

Both HDFS and the cube store 120 may be used for data storage. The HDFS may be used for storing huge amounts of data with mostly sequential access, whereas the main strength of cube store 120 is fast random access to data. Business solutions may combine the best capabilities of HDFS and cube store 120 to meet their data storage needs.

Applications may store data in the cube store 120 into labeled tables, which include rows and columns. In one embodiment, the cube store 120 may be an HBase data cube having tables referred to as HBase tables. The table cells represent the intersection of row and column coordinates and are versioned. By default, their version is a timestamp auto-assigned by the cube store 120 at the time of cell insertion. A cell's content is an uninterpreted array of bytes.

The table rowkeys may also represent byte arrays. In example embodiments, the rowkeys may range from strings to binary representations of long or even serialized data structures. The HBase table rows are sorted by the rowkey, which is the table's primary key. The sort is byte-ordered. All HBase table accesses are via the table primary key.

The row columns are grouped into column families. All column family members have a common prefix. The column family prefix may be composed of printable characters. The qualifying tail, which is the column family qualifier, can be made of any arbitrary bytes. An HBase table's column family members may be specified up front while defining the HBase table schema definition. However, new column family members can be added on demand. Physically, all column family members are stored together on the filesystem. For example, the storage underlying the cube store 120 may be the HDFS within the Hadoop system 110.

The HBase tables may be similar to a relational database management system (RDBMS), with the exception that cells are versioned, rows are sorted, and columns can be added on the fly by the client as long as the column family they belong to preexists.

The HBase tables are automatically partitioned horizontally by the cube store 120 into regions. Each region comprises a subset of the HBase table's rows. As the HBase table grows, the number of regions grows. Regions are the units that get distributed over an HBase cluster within the cube store 120. An HBase table that is too big for any one server can be carried by a cluster of servers, with each node hosting a subset of the HBase table's total regions. As such, the load of the table may be distributed over several servers.

The Hadoop OLAP engine 190 includes a server 130, a query engine 140, a metadata engine 150 and a cube build engine 160 in an example embodiment. The Hadoop OLAP engine 190 provides an SQL interface and enables multi-dimensional analysis (with OLAP technology) using the cube store 120 for scale-out big data analysis. In an example embodiment, the Hadoop OLAP engine 190 is built on top of the Hadoop system 110 and the cube store 120, with low latency and high concurrency for PB size data analysis. The Hadoop OLAP engine 190 may provide a standard and easy to use interface. In an example embodiment, an SQL interface is enabled with a Java database connectivity (JDBC) or open database connectivity (ODBC) driver 142, which may be referred to as the JDBC/ODBC driver 142. The JDBC/ODBC driver 142 may support JDBC, ODBC, or both JDBC and ODBC. In example embodiments, the Hadoop OLAP engine 190 may be tightly integrated with front-end tools such as BI platforms or SQL-based tools 180. The Hadoop OLAP engine 190 reduces data movement and accelerates time-to-market of data. In other example embodiments, the cube store 120 provides better performance than other solutions and supports up to terabyte (TB) size data cubes. Concurrency is also provided in various embodiments. In other embodiments, the cube store 120 definitions support metadata. The Hadoop OLAP engine 190 is driven by the metadata that will translate the SQL query into a cube store query.

In an example embodiment, one or more features of the Hadoop OLAP engine 190 are configured to include: a full OLAP Analysis Engine (e.g., the OLAP Engine 190) on top of the Hadoop system 110 and the cube store 120; a unified SQL interface for business analysts and developers (e.g., thru JDBC/ODBC driver 142); support for a routing query between the Hadoop OLAP Engine 190, the Hadoop system 100, and the cube store 120; a low latency and high concurrency architecture; and a scalable architecture for to scaling-out TB to PB size analysis.

Figure 9A:
FIGS. 9A and 9B illustrate rowkeys, according to one embodiment.
Figure 9B:
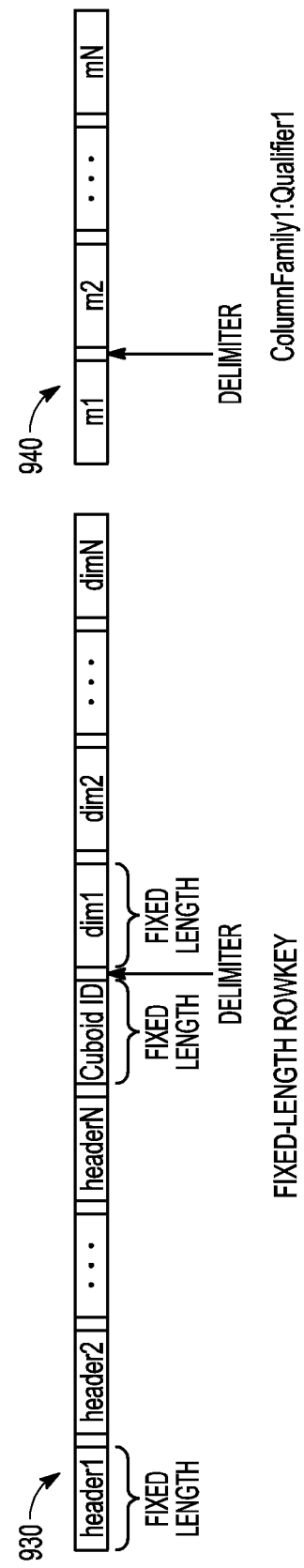

The storage engine 145 may be used to isolate the query engine 140 from the underlying the cube store 120. The storage engine 145 provides aggregated data over data path 144 to the routing engine 143. For an example embodiment, the HBase Schema for the storage engine 145 is shown in FIGS. 9A and 9B.

In an example embodiment, the server 130 offers web service through Representational State Transfer (REST) protocol and enables a third party to access those services via open application programming interface (API) over data path 171.

Figure 2:
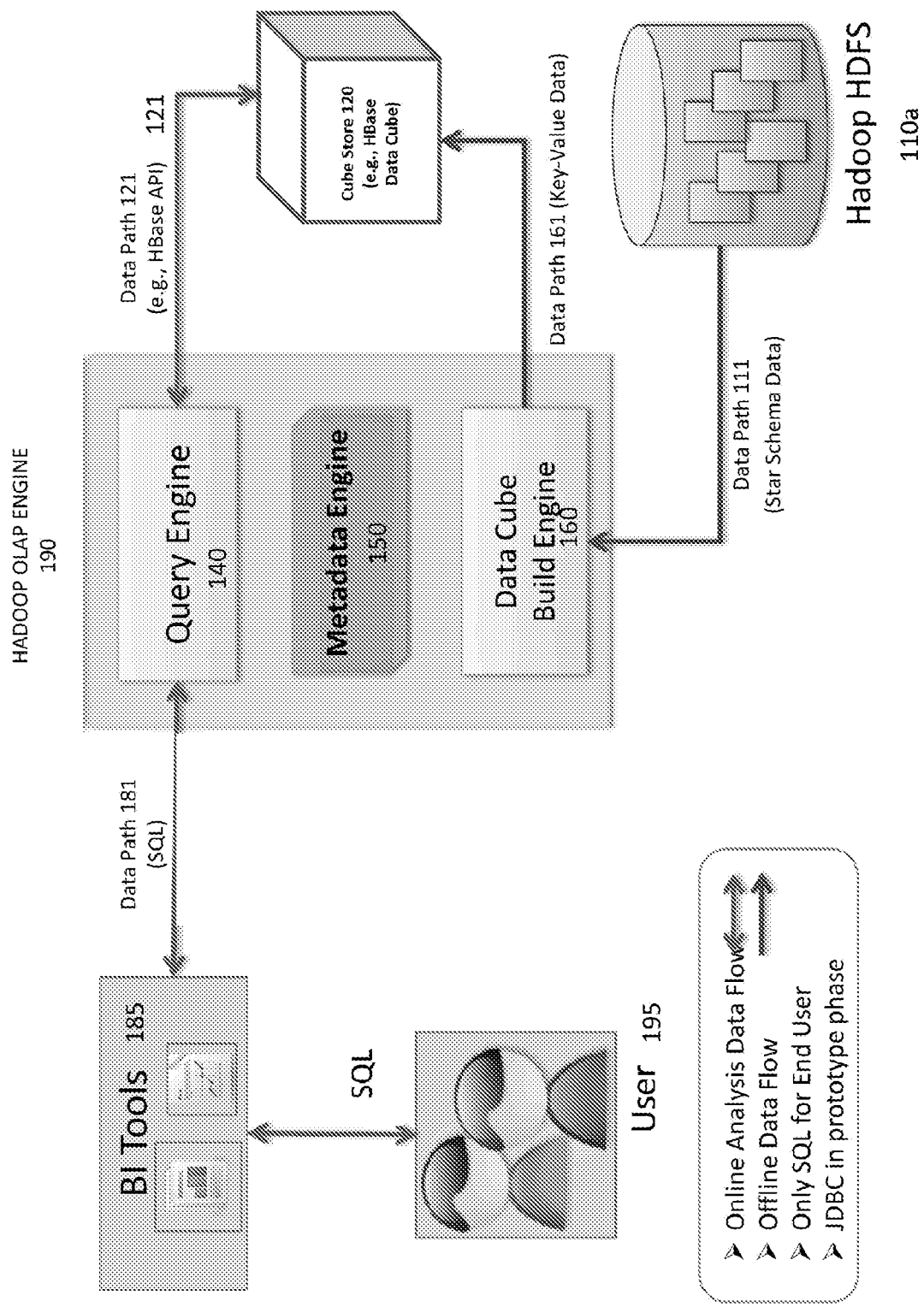
FIG. 2 illustrates a block diagram of a user using retrieving information stored in the cube store within a Hadoop OLAP system, according to an example embodiment.

Referring to FIG. 2, in an example embodiment, a user 195 may query the cube store 120 using BI Tools 185 over data path 181 using an SQL query to access BI information (e.g., BI reports, charts, and other data). The query engine 140 receives the SQL query and converts the query to a cube query in order to access one or more cubes stored in cube store 120 over data path 121 using an API (e.g., HBase API). In an example embodiment, the cube store 120 may be an HBase data cube. The data (e.g., business, financial, and other data) stored in cube tables (not shown) in the cube store 120 may be used to generate or produce BI information in response to the online request from the BI Tools 185.

In other embodiments, a user accessing a $3^{rd}$ party application 170 via an API over a data path 171 may request BI information from server 130, as shown in FIG. 1. The server 130 serves the query engine 140 over data path 131 with the request for BI information. The query engine 140 accesses one or more cubes stored in cube store 120 over data path 121. Data stored in cube tables (not shown) may be used to generate or produce BI information in response to the online request from the $3^{rd}$ party application 170.

The pre-aggregated data cube refers to a data modeler can define their data model (the metadata part) and store the metadata part in the Hadoop OLAP system 100. The cube build engine is then capable of running backend jobs to pre-calculate and aggregate data, and then storing the final result in the cube store 120. The runtime-aggregate means the Hadoop OLAP system 100 has access to the user's query history and, based on that query pattern, is capable of generating metadata automatically, then calling the cube build engine to build such data cube.

Referring to FIG. 1, in an example embodiment, data path 111 is used to transport data from the Hadoop system 110 to the Hadoop OLAP engine 190, and data path 141 provides the data path to transport data from the Hadoop OLAP engine 190 to the Hadoop system 110. In an example embodiment, data paths 111 and 161 may be used for offline data flow for building cubes, and data path 121 may be used for online analysis data flow. The data path 121 may be a low-latency data path that provides data very quickly (in a matter of seconds). The data path 141 may be a mid-latency data path that provides data very quickly (in a matter of minutes). The data path 141 may be used by the routing engine 143 when data requested from a user (through a query) is not available in the cube store 120.

In an example embodiment, the routing engine 143 allows a user to run the same SQL query on the Hadoop system 110 and the cube store 120. When the data is already stored in the cube store 120, the routing engine 143 may directly access the cube data from the cube store 120 and respond back to the query engine 140 within seconds latency (e.g., over data path 121). If the cube data has not been materialized (e.g., built into the cube store 120), then the routing engine 143 may access a Hadoop query interface (e.g., the Hive and the Tez—not shown) and provide data back to the client within minutes latency. The Hive or Apache Hive data warehouse software facilitates querying and managing large datasets residing in distributed storage. The Tez or Apache Tez generalizes MapReduce paradigm and allows for a complex directed-acyclic-graph of tasks for processing data. In one embodiment, the requested data may be provided to query engine 140 from the Hadoop system 110 over data path 141. The data path 141 may be considered a mid-latency path and provide the requested data within minutes.

In one example, the cube store 120 receives key/value data from the data cube build engine 160 over data path 161. The Hadoop HDFS 110a, as shown in FIG. 2, provides star schema data over data path 111 to the data cube build engine 160. The star schema data is referred to as the source data and represents source data. The final file stored in data cube 120 may be stored into HBase tables (not shown), in an example embodiment.

Figure 12:
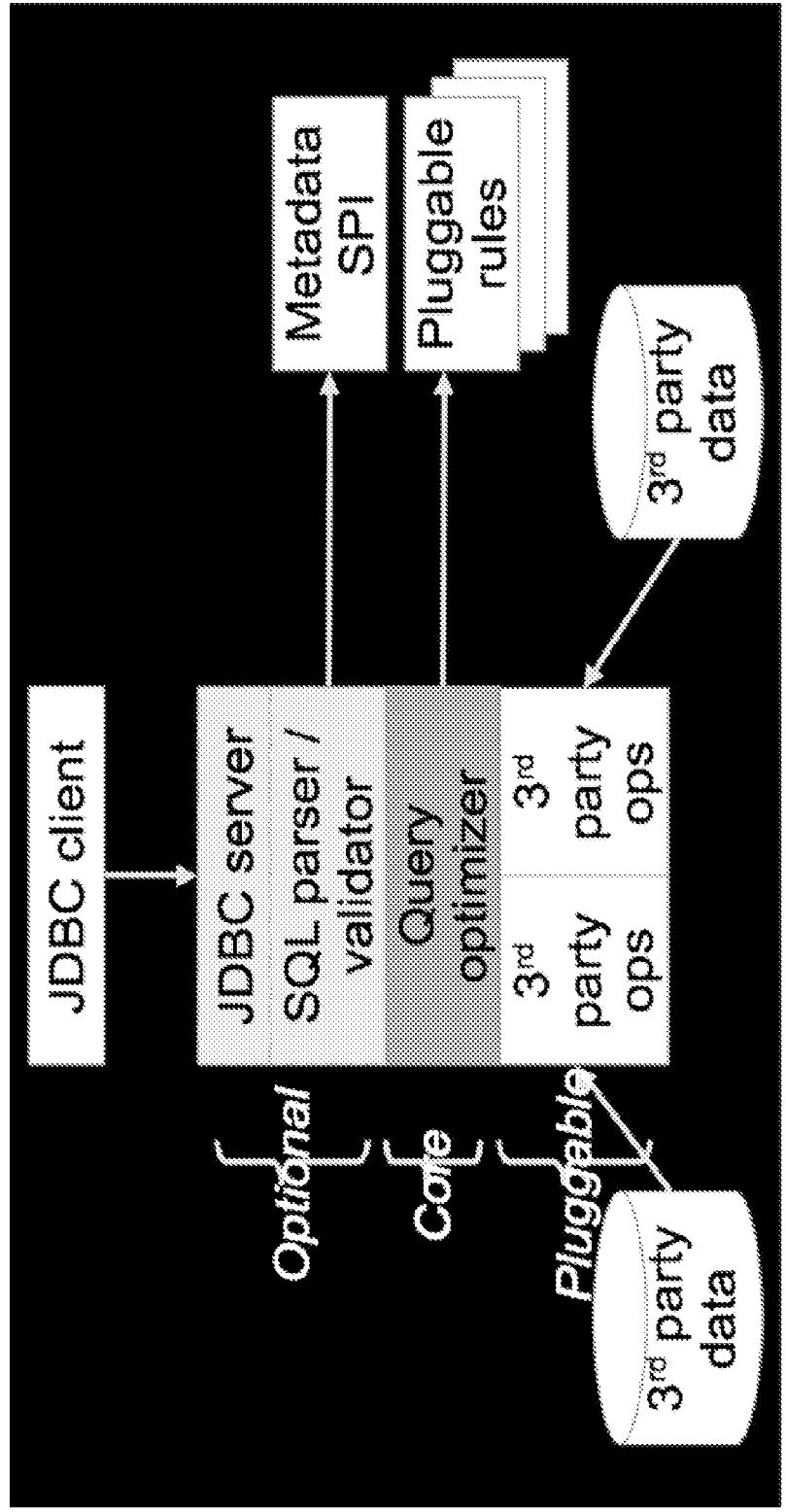
FIG. 12 illustrates a query engine according to one embodiment, according to one embodiment.

FIG. 12 illustrates an example embodiment of a query engine 1200. The query engine 1200 may be used to implement the query engine 140, shown in FIG. 1. The query engine 1200 may be based on Optiq, which is an extensible open source SQL engine. The query engine 1200 may be referred to as an OLAP engine. The query engine 140 may be enabled to receive SQL queries from the JDBC (client and server). One of the key functions of the query engine 140 is to convert an SQL query into an HBase query. The HBase query is used to access data from the cube store 120, shown in FIG. 1.

Example of OLAP Data Model Design

Figure 4A:
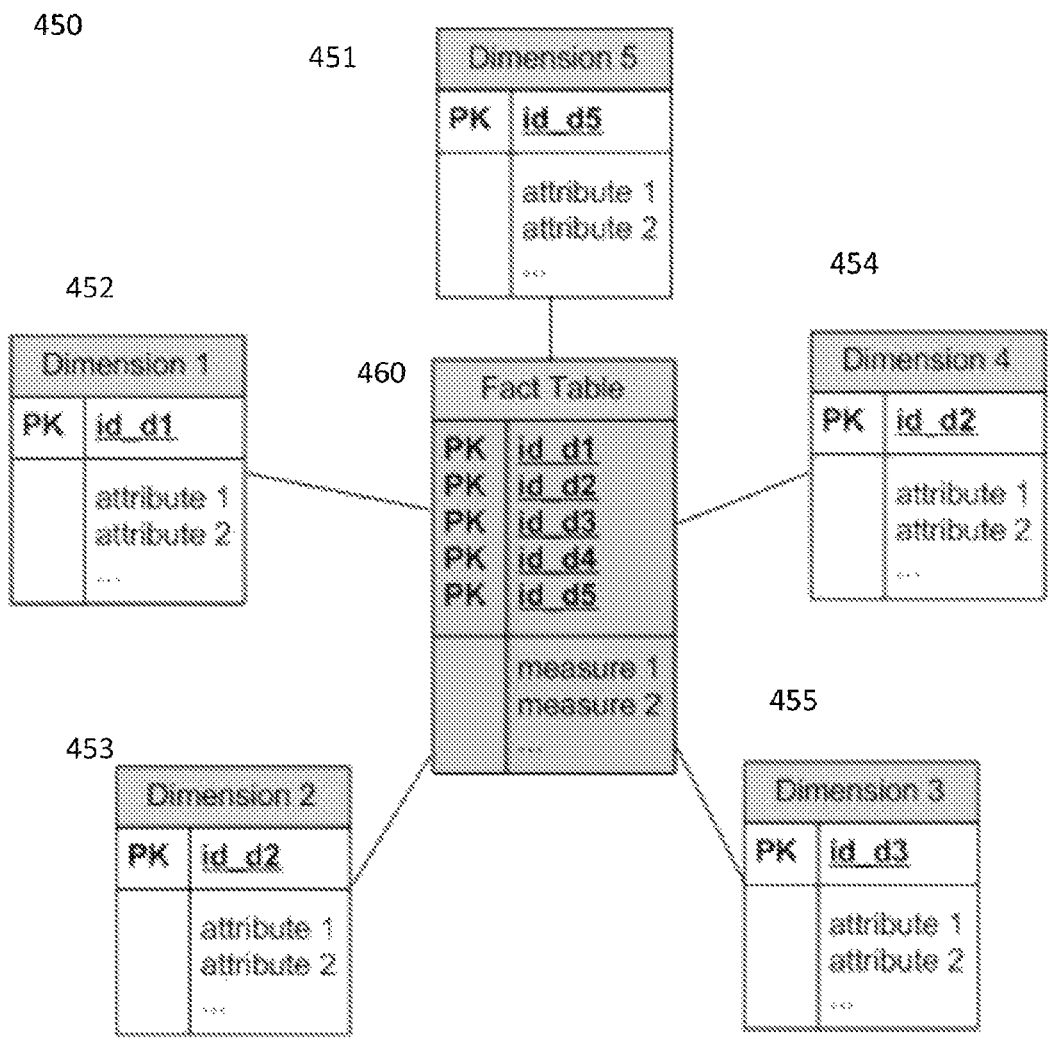
FIG. 4A illustrates a star schema according to an example embodiment.

In an example embodiment, a star schema is used by the Hadoop system 110 to build cuboids. One data cube stored in the cube store 120 may be represented by many cuboids. FIG. 4A illustrates a star schema 450. The star schema 450 represents a data warehouse schema. A star schema resembles a star, with points radiating from a center. The center of the star schema 450 is a fact table 460 and the points of the star schema 450 are the dimension tables 451-455. The fact table 460 provides an example of a fact table having two types of columns: foreign keys to dimension tables and measures information (also referred to as facts). Generally, fact tables consist of the measurements, metrics or facts of a business process. Fact tables contain the content of the data warehouse and store different types of measures like additive, non-additive, and semi additive measures. The additive measures are measures that can be added across any dimension. The non-additive measures are measures that cannot be added across any dimension. The semi additive measures are measures that can be added across some dimensions.

The dimension tables 451-455 provides examples of dimension tables for 5 different dimensions. A dimension is a structure usually composed of one or more hierarchies that categorize data. The primary keys of each of the dimension tables 451-455 are part of the composite primary key of the fact table. Dimensional attributes help to describe the dimensional value. They are normally descriptive, textual values. Dimension tables are generally smaller in size then fact table. In one example, a fact table may store data about sales, while the dimension tables may store data about geographic regions (e.g., markets, cities), clients, product, times, and channels. The star schema format is commonly used in data warehouse implementations, and are widely supported by many BI tools.

In an example embodiment, there are three dimensions—product, customer and date. The fact is a sale of product to a customer on a date. The measure could be the number of items sold and the total price. To provide consistent performance, an OLAP system, such as the Hadoop OLAP system 100, stores and maintains aggregations for all possible (or almost all) subsets of dimensions. A cube based on a subset of dimensions is called a cuboid.

Figure 4B:
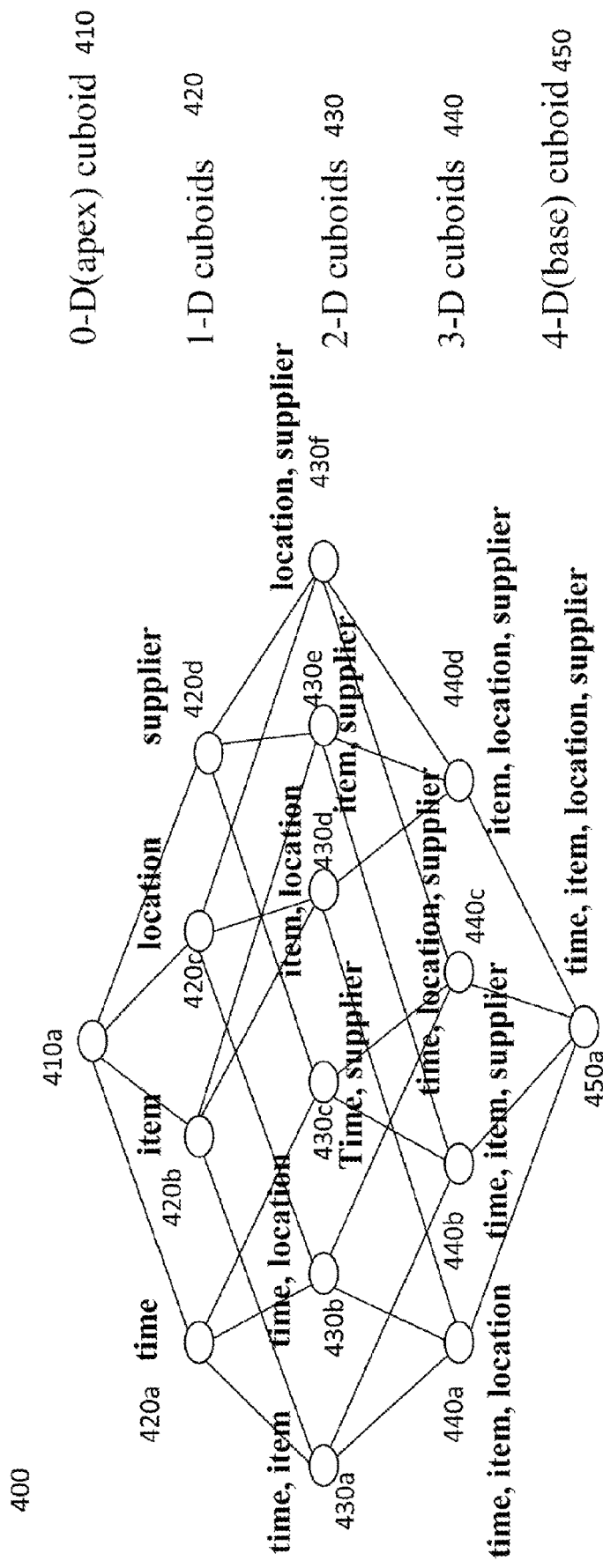
FIG. 4B illustrates a 4-dimensional (4-D) cube lattice and a corresponding chart showing cube dimensions, according to one embodiment.

In various embodiments, a data cube may be represented by a lattice of cuboids. FIG. 4B illustrates a 4-D cube lattice 400 that contains 16 cuboids and 4 dimensions. The number of cuboids generated may be determined by the number of dimensions. For example, N dimensions may generate $2^N$ cuboids. For example, 4 dimensions may generate 16 cuboids (with 5 dimension combinations, including the apex and base cuboids), and 3 dimensions may generate 8 cuboids (with 4 dimension combinations including the apex and base cuboids).

The cube lattice 400 includes 4 dimensions. The dimensions shown in FIG. 4B include time, item, location, and supplier. The 4-D cuboid 450 (also represents the base of the cube lattice 400) includes the set of cuboids having four dimensions, the 3-D cuboids 440 includes the set of cuboids having three dimensions, the 2-D cuboids 430 include the set of cuboids having two dimensions, and the 1-D cuboid 420 includes the set of cuboids having one parameter. The 0-D 410 represents the apex of the cube lattice 400. Each of the cuboids is represented by a circle in the cube lattice 400. There are a total of 16 cuboids shown in the cube lattice 400. The circle 410a represents 0-D (apex) cuboid having 0 dimensions. The circles 420a-420d represent 1-D cuboids, each having 1 dimension. The circles 430a-430f represents 2-D cuboids, each having 2 dimensions. The circles 440a-440d represents 3-D cuboids, each having 3 dimensions. The circle 450a represents a 4-D (base) cuboid having 4 dimensions.

In an example embodiment, building the cube includes generating $N^2$ cuboids for a multi-dimensional cube lattice having N dimensions during the multi-stage MapReduce job having N+1 stages such that cuboids having N dimensions are generated at the first stage of N+1 stages, cuboids having N−1 dimensions are generated at the second stage of N+1 stages, and so forth until a zero-dimensional cuboid referred as the apex is generated at the last stage of the N+1 stages.

Figure 10:
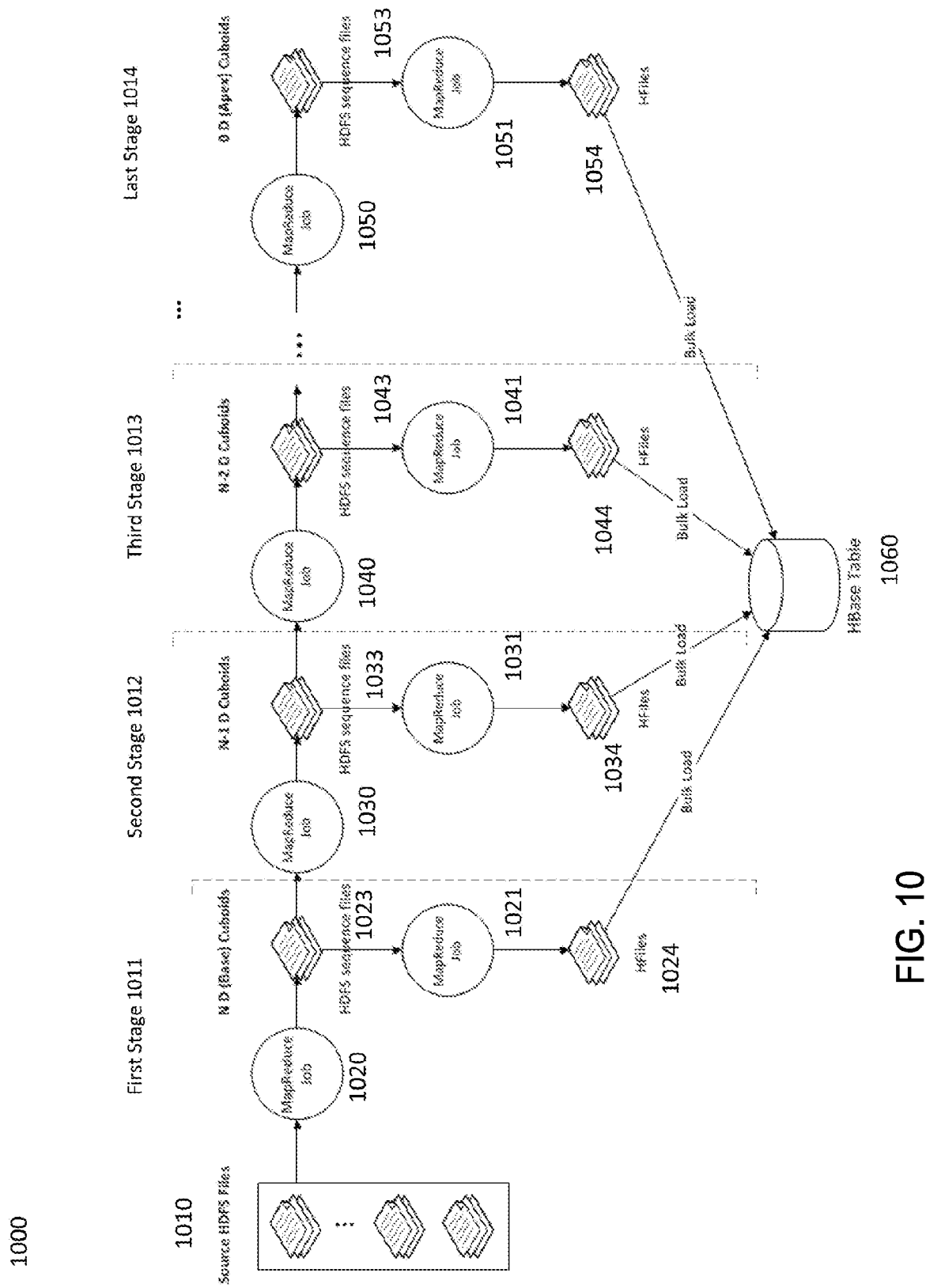
FIG. 10 illustrates an example of a multi-staged MapReduced job to build a data cube.

During a multi-stage MapReduce job to build a data cube, the cuboids are built in stages. In various embodiments, the multi-stage MapReduce job may include one or more MapReduce jobs at each stage. FIG. 10 illustrates another example flow 1000 of a multi-stage MapReduce job and will be described below.

A user 195 may write an SQL query based on a star schema. The query engine 140 (which may be referred to as an OLAP engine) may translate the SQL query to an HBase query in an example embodiment. FIGS. 4C and 4D illustrate an example of an SQL query used to access data from the cube data 120. The query includes the following modules or instructions: Get a cuboid 401 and the 2-D slice cuboid 402 are shown in FIG. 4C. The 3-D slice cuboid 403 and the Drill-down 404 are shown in FIG. 4D. The full materialization of a data cube with N dimensions may require $2^N$ cuboids. For example, 10 dimensions require 1K cuboids and 20 dimensions require 1M cuboids. Various embodiments support different materialization policies. In an example embodiment, one data cube will be mapped to one or more tables in the cube store 120.

FIGS. 4E and 4F illustrate a full materialization schema for an HBASE schema design, according to an example embodiment. The HBase Mapping 421, specifies the id 421 representing the cube id, the fact table 423, the dimensions 424, the measures 425, and the HBase mapping 426.

In the example shown in FIGS. 4E and 4F, one HBase table may be mapped to one data cube, which contains multiple cuboids. In one embodiment, the rowkey includes a "cuboid id," which may be set to the first part of the rowkey. In further embodiments, the values of the cuboid and dimensions may be encoded to integers for performance considerations. An example of a rowkey having fields for the cuboid id and dimensions 1 through n, are illustrated by the fields: cuboid id, dim1, dim2 . . . dimn, shown in FIG. 9B. In alternative embodiments, dictionary tables may be created such as a cuboid id mapping table and a dimension value cardinality table. These tables may be created for further optimizations.

A data cube is eventually stored in one or more tables in the data store 120, such as an HBase table. For each n-D cuboid, the cube data is generated and stored in HDFS temporary using a sequence file format. The sequence file format is then converted to an HFile and then loaded into the cube store 120. In example embodiments, the data cubes are generated and built by the data cube build engine 160. For other embodiments, the HBase table may be created prior with pre-split regions, and then loading the data into the HBase table using an HBase bulk load. In an example embodiment, the HBase table may be created by the metadata definition and split regions by the cube build engine 160.

For high dimensional schemas having high cube dimensions, full materialization may not be performed. Two alternative solutions may be used to reduce the cube size: partial materialized and shell fragment. Partial materialized is used to materialize a subset of cuboids. The query engine 140 may do some runtime aggregation based on an ancestor cuboid. The only schema difference between full and partial materialization is the table record in which cuboids are materialized. Shell fragment refers to vertically partitioning a high dimensional dataset into a set of disjointed low dimensional datasets called fragments. These shell fragments are pre-computed offline and are used to compute queries in an online fashion.

Cube Building Optimization: Multi-Staged Build

Figure 5:
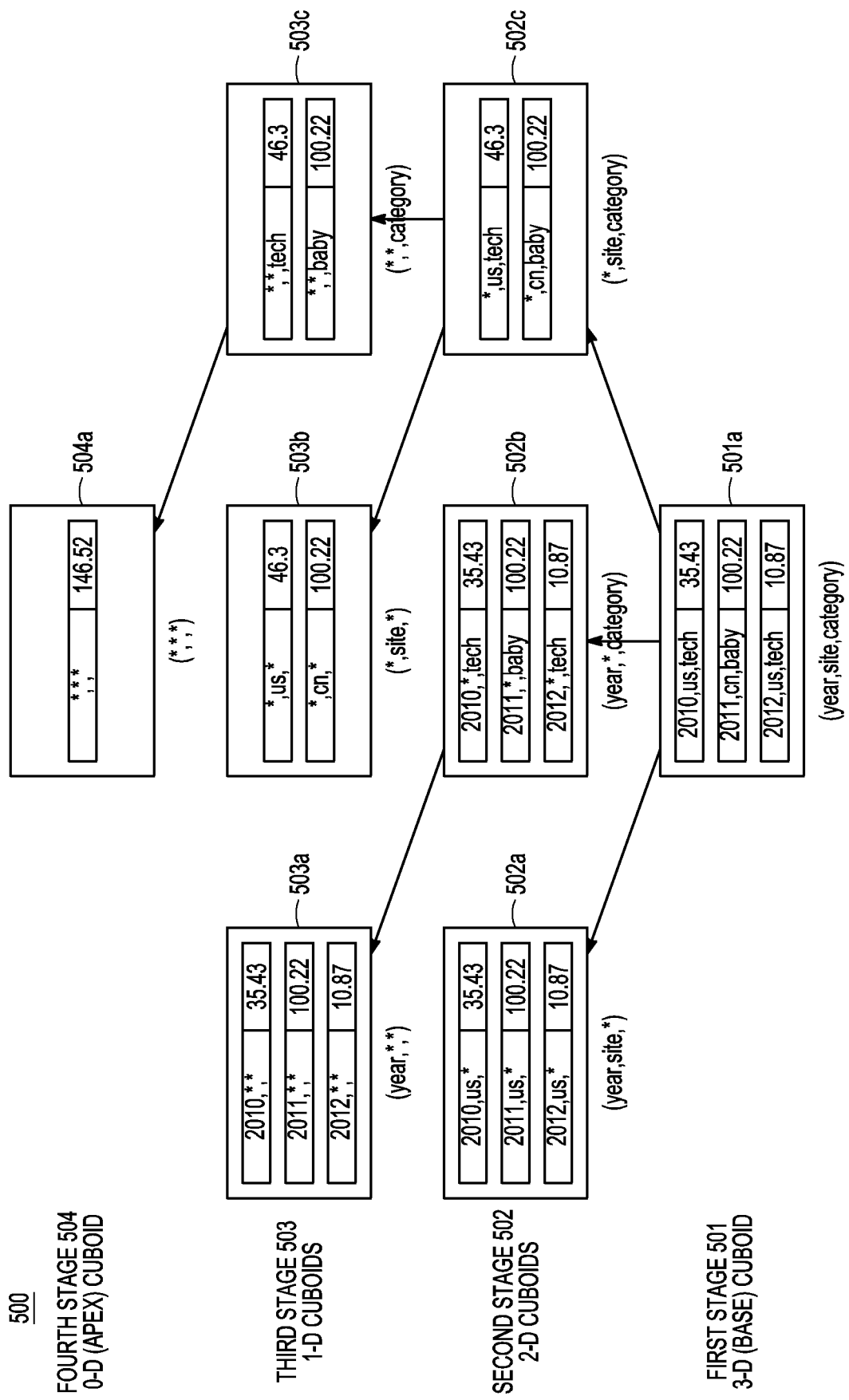
FIG. 5 illustrates a multi-stage MapReduce job with a three-dimensional (3-D) cuboid, according to an example embodiment.

Since N dimensions will generate $2^N$ cuboids, (e.g., 4 dimensions will generate 16 cuboids), it may be too costly (in terms of processing time and intermediate file size) to generate all cuboids in one map-reduce stage. In one embodiment, cuboids may be generated by a multi-stage MapReduce job, where each stage will only aggregate one set of dimensions. Referring to the multi-stage MapReduce job example shown in FIG. 5, the cube lattice 500 may be built in multiple stages: the first stage 501 is to build the base cuboid 501, the second stage 502 is the build the 2-D cuboids 502a-c, the third stage 503 is to build the 1-D cuboids 503a-c, and the fourth stage 504 is to build the 0-D cuboid 504a. The building of cuboids in stages may significantly reduce the intermediate output. The first stage 501 represents a set of dimensions having 3 dimensions, the second stage 502 represents a set of dimensions having 2 dimensions, the third stage 503 represents a set of dimensions having 1 dimension, and the fourth stage 504 represents a set of dimensions have 0 dimensions. Each of the cuboids 501a, 502a-c, 503a-c and 504a illustrate the dimension information or key (year, site, and category) and the measure information (value).

In an example embodiment, the metadata engine generates the cube metadata and the cube build engine generates the cube data for a cube based on the cube metadata (received from the metadata engine) and the source data. The cube build engine then performs a multi-stage MapReduce on the source data to produce a multi-dimensional cube lattice having multiple cuboids. The cube data generated is provided to the cube store.

Cube Building Optimization: Incremental Build Methodology

In an example embodiment, an incremental build methodology for cube store 120 may be used to avoid running a huge job against the entire dataset. The incremental build methodology may refresh the dataset with updated data specified by the designer of the cube store 120. The cube store 120 may be partitioned by time slot. The query engine 140 may also aggregate the data partition during runtime. The incremental refresh methodology may be referred to as a materialization algorithm used to "append & merge." The term "append" refers to generating a new data cube using a minimum time slot (e.g., day). The data cube may be created only once and refreshed periodically. The term "merge" refers to merging the cube data from the small time slot (e.g., day) to the cube data from the large time slot (e.g. week/month/quarter/year), where a granularity of the merging time slot is configurable.

Figure 6A:
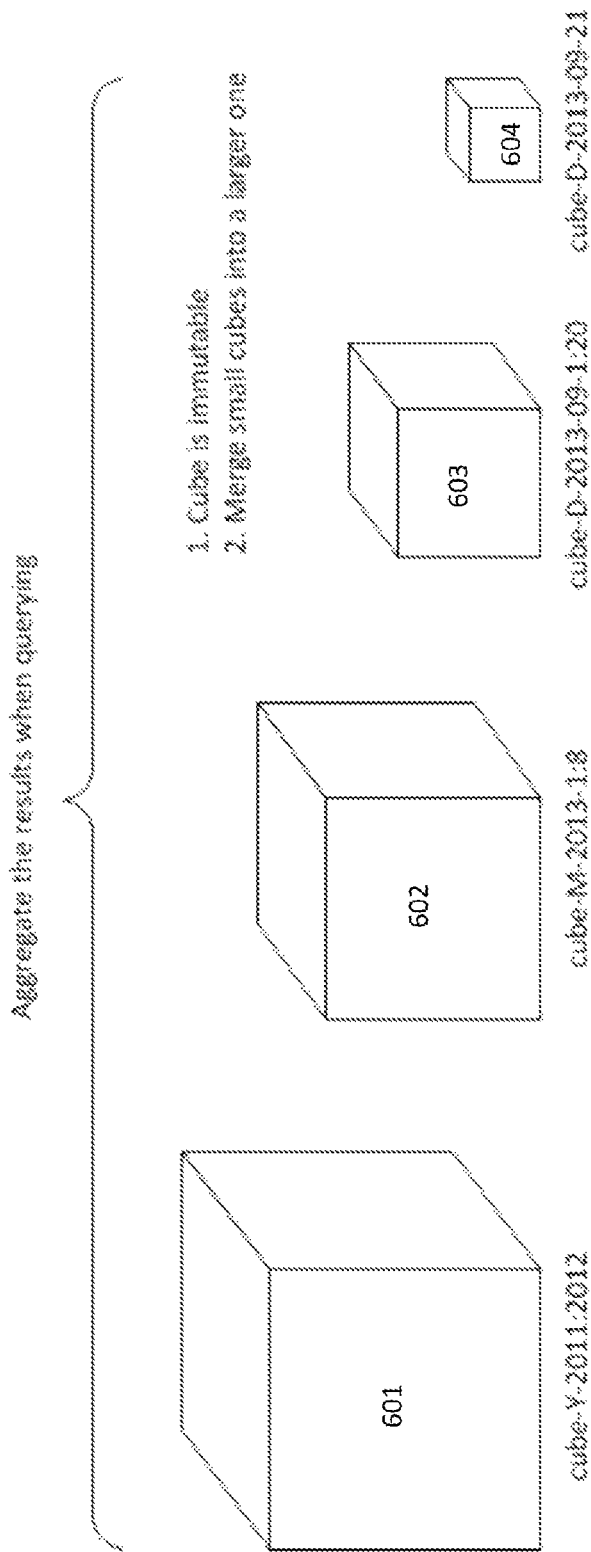
FIG. 6A illustrates an example of aggregating the results from a query

FIG. 6A illustrates an example of aggregating the results when querying. Data for a data cube representing data from 2011 to Sep. 21, 2013 is being aggregated by the four blocks 401-404. Each block represents a data partition for a specified time period, and may be referred to as time slot partitioned data in various embodiments. The data cube is partitioned into the data cube-Y-2011:2012, data cube-M-2013-1:8, data cube-D-2013-09-1:20, and data cube-D-2013-09-21. The time slot partitioned data may be partitioned into equal time slots (e.g., month 1, month 2 . . . month n) or partitioned into varying time slots (e.g., year, month, day).

Cube Building Optimization: Partial Materialization

The high cardinality dimension may increase the data size of the data cube greatly. In one embodiment, constraints are placed on the materialization of high cardinality dimensions.

The "high cardinality dimension" and "materialization level on high cardinality" may be configured in the cube metadata. The build time and run time may be used for partial materialization. The cube build engine 160 may only materialize the cuboids that aggregate on high cardinality dimensions. For example, if "leaf category" and "day" are high cardinality dimensions and "item condition" and "seller segment" are low cardinality dimensions, the following cuboids will be materialized—[leaf category, item condition, seller segment], [day, item condition, seller segment]. The following cuboids will not be materialized—[leaf category, day, item condition], [leaf category, day, seller segment]. The query engine 140 may choose the closest cuboid to run the aggregation. If the group by does not contain the "high cardinality dimension," the full materialization of the cuboid may be selected. Alternatively, the smallest partial cuboid that contains the "high cardinality dimension" may be selected.

Figure 6B:
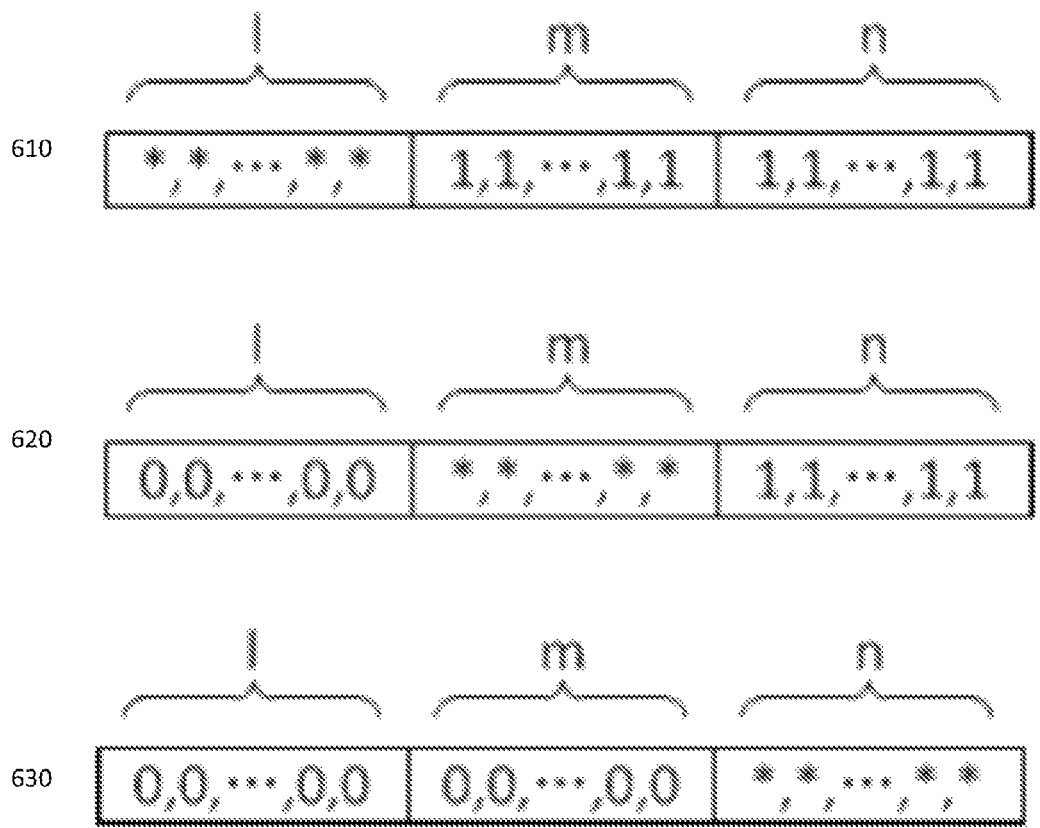
FIG. 6B illustrates an example of a partial materialization of cuboids.

For example, a total of x dimensions are provided, and the x dimensions are divided into 3 parts, as shown by dimensions 610, 620 and 630 in FIG. 6B. Each part, contains 1, m and n dimensions, where x=1+m+n.

| $d_1, d_2, \ldots, d_l$ | $d_{l+1}, d_{l+2}, \ldots, d_{l+m}$ | $d_{l+m+1}, d_{l+m+2}, \ldots, d_{l+m+n}$ |
| --- | --- | --- |

In this example, the total number of cuboids to be materialized is reduced to (2l−1)+(2m−1)+2n, compared to the original 2l+m+n.

Figure 6C:
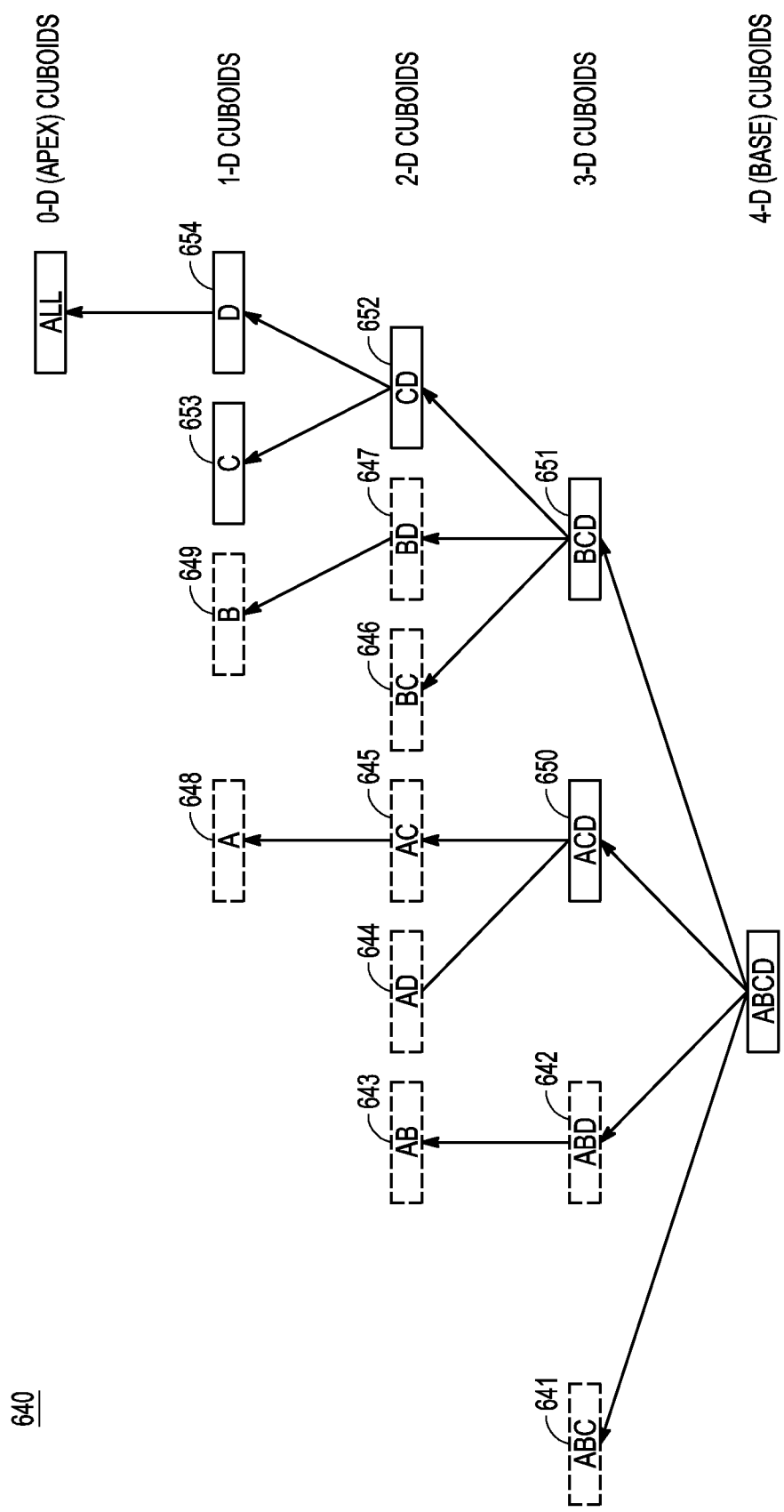
FIG. 6C illustrates a graph 640 illustrating partial materialization steps of building a 4-D cube, according to an example embodiment.

FIG. 6C illustrates a graph 640 illustrating partial materialization steps of building a 4-D cube, according to an example embodiment. As shown in FIG. 6C, the gray cuboids 641-649 may be pruned. The white cuboids 650-654 may not pruned. Dimensions A and B represent high cardinality dimensions, and C and D represent low cardinality dimensions in the example shown in FIG. 6C. The white cuboids are materialized, or not pruned, because they contain two aggregated low cardinality dimensions or only a single low cardinality dimension (and not combined with any high cardinality dimensions). If a user's query reaches a cuboid A, it will traverse back to its ancestor cuboid ACD.

Example MapReduce Algorithm for Creating a Data Cube

The Hadoop system 110 includes the MapReduce, which performs the MapReduce jobs. The output of the MapReduce jobs may be stored in HDFS using a sequence file format, and eventually converted to HFile to be stored in tables in the the cube store 120.

A basic MapReduce algorithm for generating cube data having multiple cuboids is described below.

| MAP(e) | |
| --- | --- |
| 1 | # e is a tuple in the data |
| 2 | let C be the Cube Lattice |

|   |   |
|---|---|
| 3 | for each Region R in C |
| 4 | do k = R(e); |
| 5 | EMIT k ⇒ e |
| REDUCE/COMBINE(k, {e₁, e₂, ...}) | |
| 1 | let M be the measure function |
| 2 | EMIT k ⇒ M({e₁, e₂, ...}) |

It should be noted that this algorithm only works for algebraic and distributive measures. The definition of distributive, algebraic, and holistic measure are as follows:

Distributive: An aggregate function is distributive if it can be computed in a distributed manner as follows. Suppose the data are partitioned into n sets. We apply the function to each partition, resulting in aggregate values. If the result derived by applying the function to the n aggregate values is the same as that derived by applying the function to the entire data set (without partitioning), the function can be computed in a distributed manner. For example, sum( ) can be computed for a data cube store 120 by first partitioning the cube store 120 into a set of subcube stores 120, computing sum( ) for each subcube store 120, and then summing up the counts obtained for each subcube store 120. Hence, sum( ) is a distributive aggregate function. For the same reason, count( ), min( ), and max( ) are distributive aggregate functions. By treating the count value of each nonempty base cell as 1 by default, count( ) of any cell in a cube store 120 can be viewed as the sum of the count values of all of its corresponding child cells in its subcube store 120. Thus, count( ) is distributive. A measure is distributive if it is obtained by applying a distributive aggregate function. Distributive measures can be computed efficiently because of the way the computation can be partitioned.

Algebraic: An aggregate function is algebraic if it can be computed by an algebraic function with M arguments (where M is a bounded positive integer), each of which is obtained by applying a distributive aggregate function. For example, avg( )(average) can be computed by sum( )/count( ), where both sum( ) and count( ) are distributive aggregate functions. Similarly, it can be shown that min NO and max NO (which find the N minimum and N maximum values, respectively, in a given set) and standard deviation( ) are algebraic aggregate functions. A measure is algebraic if it is obtained by applying an algebraic aggregate function.

Holistic: An aggregate function is holistic if there is no constant bound on the storage size needed to describe a sub-aggregate. That is, there does not exist an algebraic function with M arguments (where M is a constant) that characterizes the computation. Common examples of holistic functions include median( ), mode( ), and rank( ). A measure is holistic if it is obtained by applying a holistic aggregate function.

MapReduce Example

Star schemas are often used by OLAP systems to build proprietary OLAP cubes efficiently. A star schema consists of one or more fact tables referencing any number of dimension tables. The star scheme resembles a fact table at its center and the dimension tables surrounding it represent the star's points. The star scheme separates business process into facts, which hold the measurable, quantitative data about a business, and dimensions, which are descriptive attributes related to fact data. Examples of fact data include sales price, sale quality, time, distance, speed, and weight measurements. Related dimension attribute examples include product models, product colors, product sizes, geographic locations, and salesperson names. Measures are derived from the records in the fact table, and dimensions are derived from the dimension tables. The elements of a dimension can be organized as a hierarchy (for example, as a set of parent-child relationships).

The fact tables generally consist of numeric values and foreign keys to dimensional data where descriptive information is stored. The fact tables may be assigned a surrogate key to ensure each row can be uniquely identified. The dimension tables usually have a relatively small number of records compared to the fact tables. The records in the dimension tables may have a very large number of attributes to describe the fact data. The dimensions can define a wide variety of characteristics. The dimension tables are generally assigned a surrogate primary key, usually a single-column integer data type, mapped to the combination of dimension attributes that form the natural key.

The star schema data stored in the Hadoop system 110 includes a fact table. An example fact table 710 is illustrated in FIG. 7A and can be used to get the total amount of sales grouped by year, site, and category. For this example, the dimensions are year, site, and category and represented by dim={year, site, category}, and the measure is represented by the measure=sum(usd_amt). The 3 dimensions require 8 cuboids, which are illustrated in the chart 720 shown in FIG. 7B. The rows in the fact table 710 include rows 710a-710d.

Figure 8:
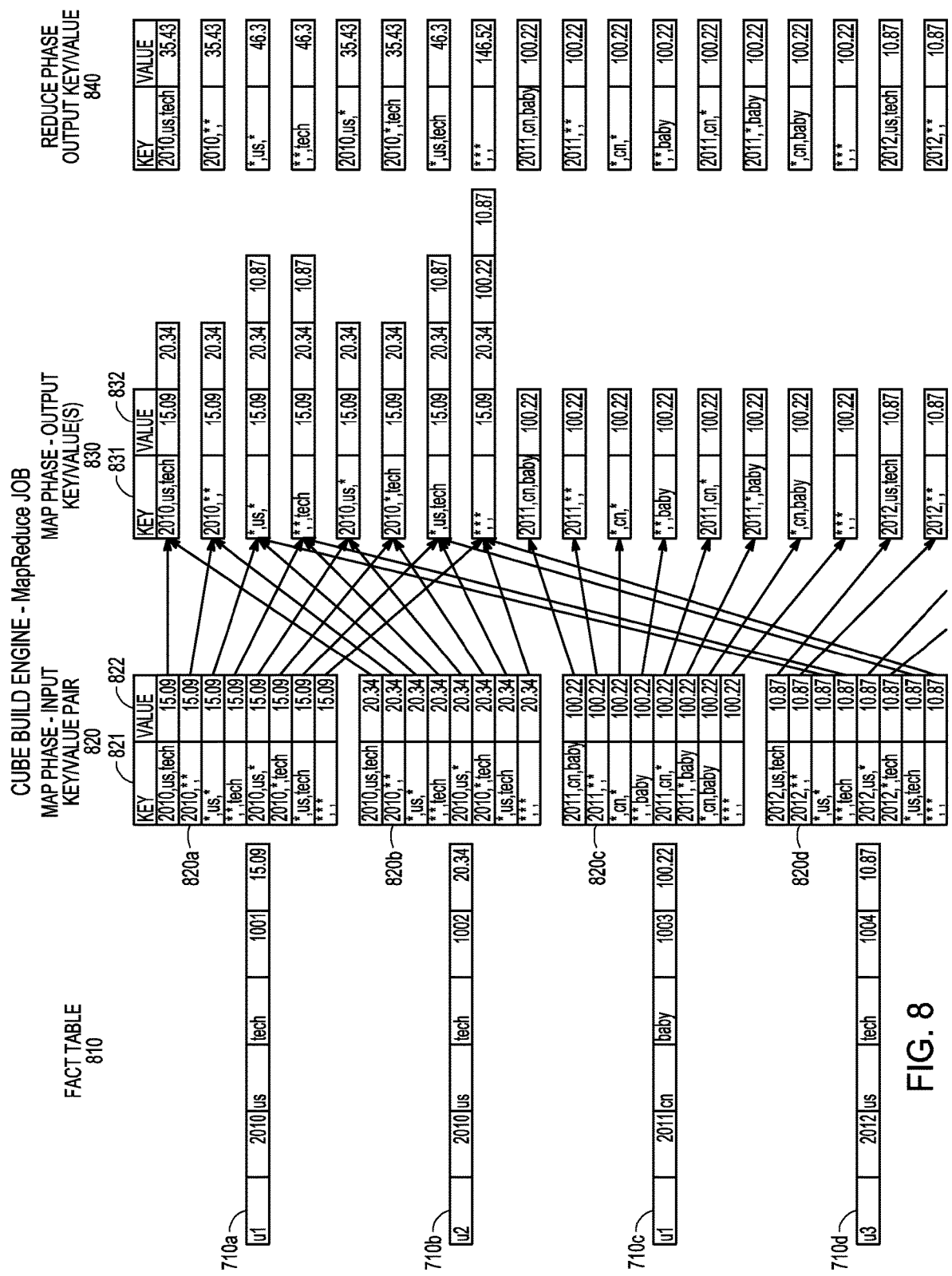
FIG. 8 illustrates an example of a MapReduce job using the fact table shown in FIG. 7A.

FIG. 8 illustrates an example of a MapReduce job using the fact table shown in FIG. 7A. The fact table 810 is shown on the left, and includes rows 710a-710d shown in FIG. 7A. The MAP phase in the MapReduce Job includes the input key/value pair 820 and the output key/value(s) 830. The Reduce phase output key/value 840 is shown on the right. During the map step, the master node takes the input, divides it into smaller sub-problems, and distributes them to the worker nodes. The worker nodes processes the smaller problems, and passes the answer back to its master node. During the reduce step, the master node collects the answers to the sub-problems and combines them in some way to form the output—the answer to the problem it was originally trying to solve.

In MapReduce, data are defined as (key, value) pairs. Mapper takes one pair of data with a type in one data domain, and returns a list of pairs in a different domain:

Map (k1, v1)→ list of (k2, v2)

After that, the MapReduce framework collects all pairs with the same key (k2) from all lists and groups them together, creating one group for each key (k2), Reducer is then applied in parallel to each group, which in turn produces a collection of values in the same domain:

Reduce (k2, list of v2)→ list of (v3)

Thus, the MapReduce framework transforms a list of (k,v) pairs into a list of values. For the example shown in FIG. 8, k1 is key 821, v1 is value 822, k2, is key 831, v2 is values 832 and the list of v3 is shown by the reduce phase output key/value 840. MapReduce may be referred to as a 5-step parallel and distributed computation:

1. Prepare the input for Mapper: the MapReduce framework designates Map processors, assigns the input key (k1) value each Mapper would work on, and provides that Mapper with all input data associated with that key value.
2. Run the user-provided Mapper code: Map( ) is run exactly once for each key (k1) value, generating output organized by key (k2) values.
3. Shuffle the Mapper output to Reducers: the MapReduce framework designates Reduce processors, assigns the key (k2) value each Reducer would work on, and provides that Reducer with all the Mapper-generated data associated with that key value.
4. Run the user-provided Reducer code: Reduce( ) is run exactly once for each key (k2) value, generating the output value (v3).
5. Produce the final output: the MapReduce framework collects all the Reducer output, and sorts it by key (k2) value to produce the final outcome.

The Map( ) procedure performs filtering and sorting (e.g. sorting students by last name into queues, one queue for each name). The Reduce( ) procedure performs a summary operation counting the number of students in each queue, yielding name frequencies).

Several challenges from the basic algorithm are described below. The first challenge arises from the large size of intermediate data being generated from the map phase, which measures at |C|×|D|, where |C| is the number of regions in the cube store 120 lattice and |D| is the size of the input data. Since |C| increases exponentially with both the number and depth of dimensions to be explored, this approach can quickly lead to the system running out of disk space during the map phase or struggling through the shuffle (i.e., sort) phase.

The second challenge arises from cube store 120 groups belonging to the data cube regions at the bottom part of the data cube lattice. The reducer that is assigned the latter group essentially has to compute the measure for the entire dataset, which is usually large enough to cause the reducer to take a significantly longer time to finish than others or even fail. As the size of the data increases, the number of such groups also increases.

The third challenge is that, for an n-dimension data cube, the full data cube will include $2^n$ cuboids. The data cube build algorithm should be optimized for big dimensions. The data cube build algorithms should be able to support incremental data cube building to reduce the cost of building big data sets.

The Rowkey Data Model and Design

The rowkey data model for the Hadoop OLAP engine 190 is described below. A well designed rowkey model to store cube data in the cube store 120 provides fast query performance. The cube data is eventually stored in cube tables such as HBase tables. For each n-D cuboid, there will be two steps performed by the data cube build engine 160: (1) generate the cube data and store it in HDFS using sequence file format; and (2) convert the sequence file format to HFile and load it to the data store 120. To optimize performance, the cube tables may be created prior with pre-splitting the regions. The cube data is then loaded into the cube table using a bulk load command such as an HBase Bulk Load command. In one embodiment, the rowkey design includes three parts: the rowkey header, the cuboid ID, and the rowkey body. The high cardinality dimensions (such as seller_id) may be included in the headers. Other performance optimization dimensions or information may be included in the headers. FIGS. 9A and 9B illustrate two examples of rowkey designs. In FIG. 9A, a variable-length rowkey 910 is shown and a fixed-length rowkey 930 is shown in FIG. 9B. The variable-length rowkey may be used as a default. The fixed length rowkey may enable better scan performance by leveraging the FuzzyRowFilter column. For the examples shown in FIGS. 9A and 9B, the rowkey body includes the dimension names represented by dim1, dim2 . . . dimN. The fields represented by header 1, header2 . . . header represent performance optimization information, such as high cardinality dimensions. The fields m1, m2 . . . nM in the column family 920 and 940 represent the values for the dimension names and/or the header fields.

FIG. 10 illustrates an example process flow of a multi-stage build of a data cube. The source HDFS files 1010 are processed by MapReduce jobs 1020-1021, 1030-1032, 1040-1041, 1050-1051, and are eventually stored in the HBase table 1060. The HBase table 1060 represents a cube table stored in the cube store 120. The source HDFS files 1010 were stored in the Hadoop system 110. The MapReduce jobs 1020-1021, 1030-1031, 1040-1041, 1050-1051 are performed by the Hadoop system 110. The process 1000 represents a multi-staged build performed by the data cube engine 160. The cube build engine 160 may perform the multi-stage build on the Hadoop System 110 (via MapReduce jobs).

In FIG. 10, the multi-staged cube build process 1000 performs a four stage build process. The multi-staged cube build process may also be referred to as the multi-stage MapReduce job in various embodiments. The first stage 1011 builds the N dimensional cuboids, the second stage 1012 builds the N−1 cuboids, the third stage 1013 builds the N−2 cuboids, and so forth until the last stage 1014 builds the 0 dimension (apex) cuboids. The first stage 1011 performs the MapReduce jobs 1020 and 1021, the second stage 1012 performs the MapReduce jobs 1030 and 1031, the third stage 1013 performs the MapReduce jobs 1040 and 1041, and the last stage 1014 performs the MapReduce jobs 1050 and 1051.

The first stage 1011 receives source data input (the source HDFS files 1010), performs the MapReduce job 1020 and provides the output HDFS sequence files 1023 to the second stage 1012. The second stage 1012 performs the MapReduce job 1030 and provides the output HDFS sequence files 1033 to the third stage 1013. The third stage 1013 performs the MapReduce job 1040 and provides the output HDFS sequence files 1043 to the next stage, until the last stage 1014 receives the output HDFS sequence files from the previous stage.

The first stage performs the MapReduce job 1021 to transform the HDFS sequence files 1023 to HFiles 1024. The second stage performs the MapReduce job 1031 to transform the HDFS sequence files 1023 to HFiles 1034. The third stage performs the MapReduce job 1041 to transform the HDFS sequence files 1023 to HFiles 1044. The last stage performs the MapReduce job 1051 to transform the HDFS sequence files 1023 to HFiles 1054.

The HFiles 1024, 1034, 1044, and 1054 are uploaded into the HBase table 1060. In some embodiments, these HFiles may be bulk uploaded. The Source HDFS files 1010 are converted to HDFS sequence files (which are temporary files stored in the HDFS) and then converted to HFiles for storage in the HBase table 1060.

Example Metadata Design

Figure 11A:
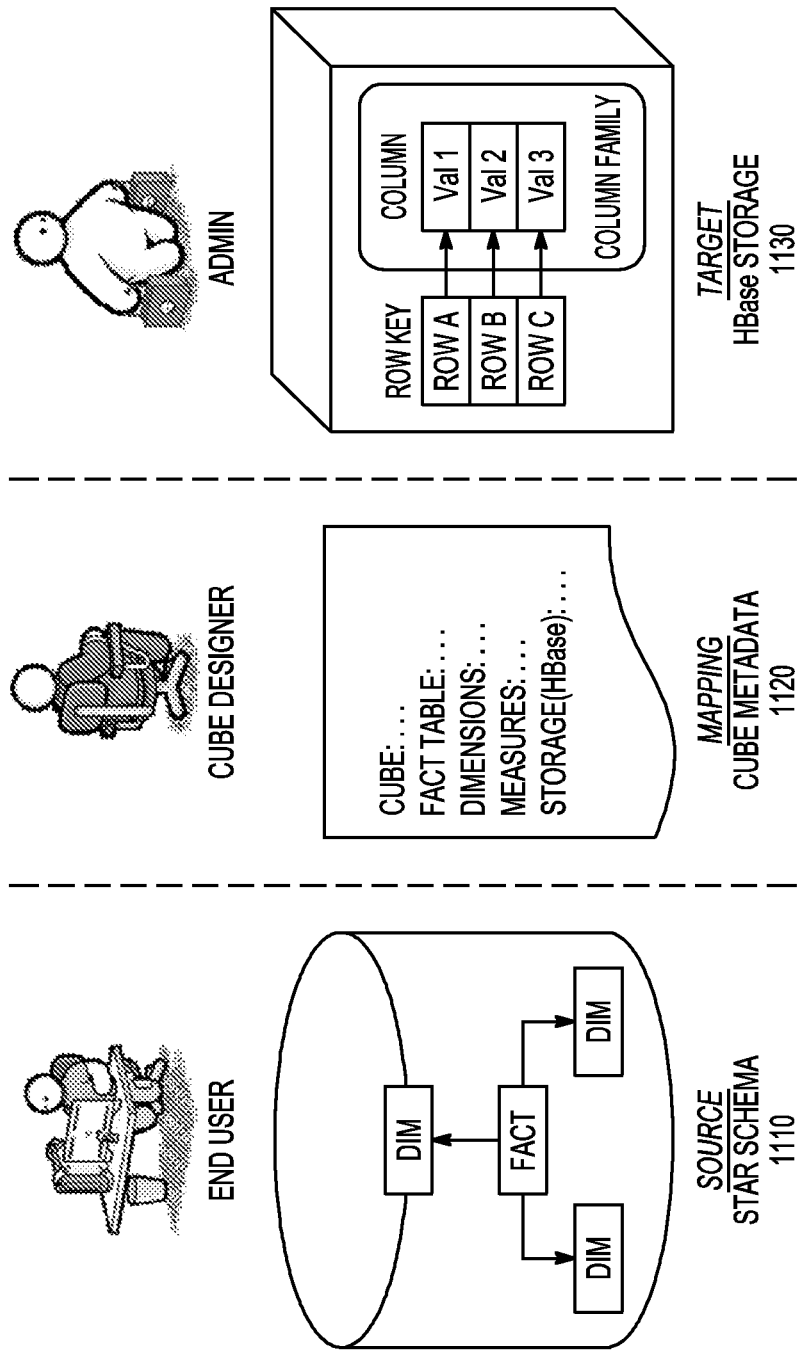
FIG. 11A illustrates a high level diagram of a metadata design, according to an example embodiment.

FIG. 11A illustrates a metadata design 1100, according to an example embodiment. The metadata design includes a data source module 1110 based on a star schema, cube metadata 1120, and HBase storage 1130. In alternative embodiments, the HBase storage 1130 may be implemented with other data stores that may be used for storing cube data. The data source module 1110 based on a star schema may be stored in the Hadoop system 110 in the HDFS. The HBase storage 1130 may be implemented with the cube store 120. The mapping using the cube metadata 1120 may be performed by the metadata engine 150.

In an example embodiment, there are two components: (1) a logical model of the data cube based on the star schema of raw data and (2) a mapping from the data cube to the cube table schema of aggregated data.

The data source module 1110 may provide metadata storage using a JSON file. In one example, all metadata information is stored on a JSON file and each table includes one JSON file to describe the metadata information. The source module 1110 may support a flat schema, where all dimensions and metrics are stored in a single table, and may support a star schema, where all dimension values are stored in a lookup table, the measure values are stored in a fact table, and FK is used to join these tables. The FK refers to one column in the fact table used for look up so that multiple fact tables can be joined.

Cube Metadata

The cube metadata for various embodiments is described below. The cube metadata is used by the Haddop OLAP Engine 190 to build the data cubes that are stored in the cube store 120. In example embodiments, the metadata engine 150 is configured to generate the metadata for building the data cubes, and the cube build engine 160 is configured to build the data cubes using the metadata and source data (e.g., star schema data received from the Hadoop system 110). The following items are described below: metadata storage, cube metadata definition, cube description, fact table, dimensions, measures, rowkey, storage and a JSON example.

FIG. 11B illustrates an example chart of the basic cube information, according to one embodiment. The chart 1140 includes the cube "Fields" id, name and status, and their descriptions. FIG. 11C illustrates a fact table using a star schema data model, according to an example embodiment. The fact table 1150 includes the "Fields" name, type, and database, and their descriptions. FIGS. 11D-11F illustrate dimension information for a cube, according to an example embodiment. The chart 1151 starts on FIG. 11D and ends on FIG. 11F. FIG. 11G illustrates example measures information for a cube in chart 1152. FIG. 11H illustrates an example of the rowkey information for a cube in chart 1153. FIG. 11I illustrates an example of the storage information for a cube in chart 1154. FIGS. 11J-11M illustrate a JSON example of cube metadata. The cube metadata example 1155 starts on FIG. 11J and ends on FIG. 11M. FIG. 11N illustrates an example metadata matrix 1156. The metadata matrix 1156 provides a description to the JSON file 1157 shown in FIG. 11O. The metadata matrix 1156 provides a definition of the metadata and the JSON file 1157 is generated based on the metadata. The JSON file 1157 provides a sample JSON source table for storing metadata.

Example Flow Diagrams

Figure 14:
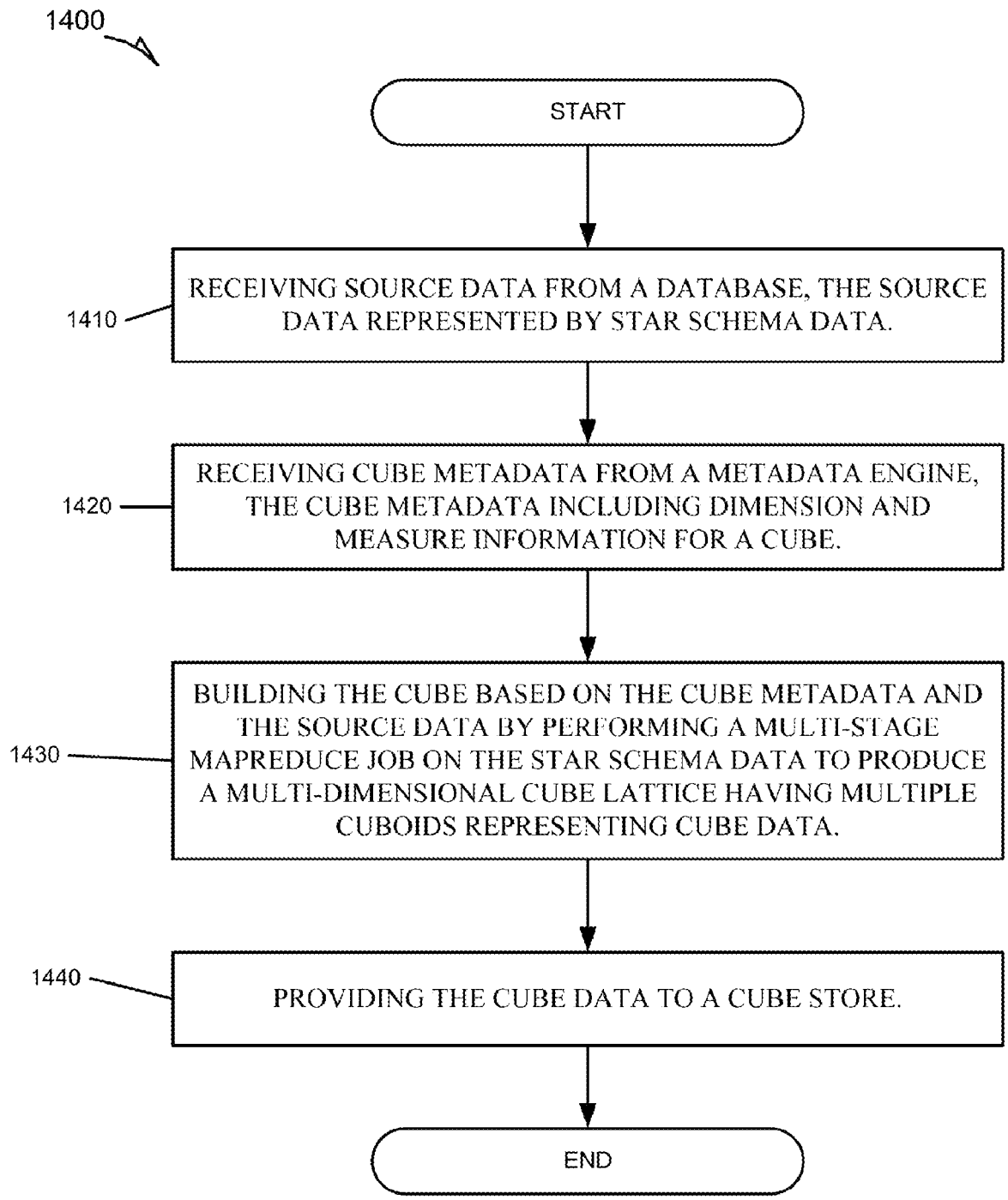
FIG. 14 is a flow diagram illustrating a method 1400 for building a cube, according to an example embodiment.
Figure 15:
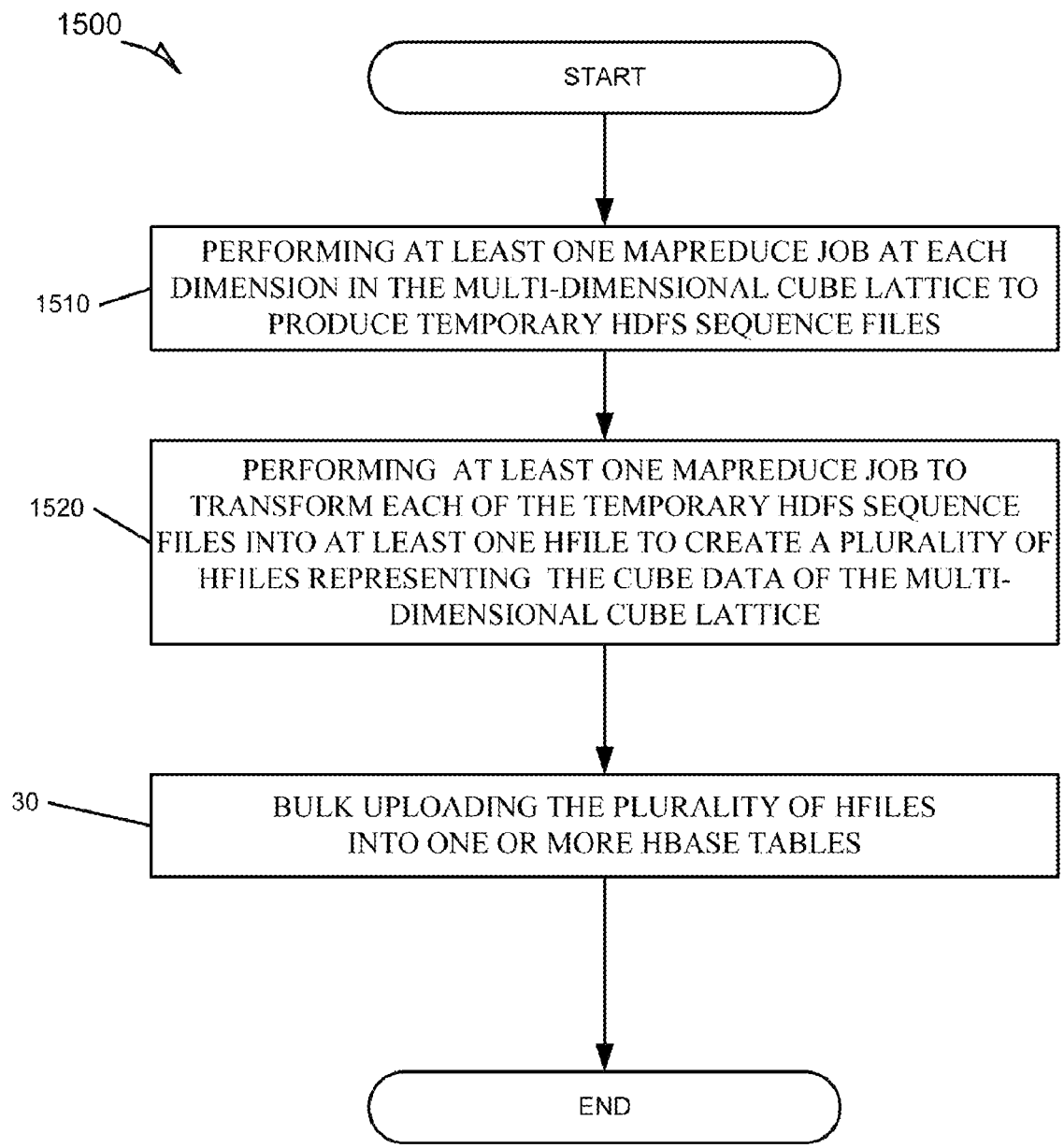
FIG. 15 is a flow diagram illustrating a method 1500 for building a cube, according to another embodiment.

In an example embodiment, the flow diagrams 1400 and 1500, shown in FIGS. 14 and 15, respectively may be implemented using one or more modules or components of the Hadoop OLAP engine 190. The flow diagrams of methods 1400 and 1500 include several operations in the embodiments shown in FIGS. 14 and 15. For alternative embodiments, one or more of the operations shown in the flow diagrams 1400 and 1500 may not be performed, and in yet further embodiments, additional operations (not shown in flow diagrams 1400 and 1500) may be performed. In yet other embodiments, one or more of the operations from the flow diagrams 1400 and 1500 may be combined into a single operation or subdivided into multiple operations.

FIG. 14 is a flow diagram illustrating a method 1400 for building a cube, according to an example embodiment. The method 1400 may be implemented using the various embodiments shown in FIGS. 1-3, for example. In an example embodiment, the method 1400 includes: at operation 1410, receiving source data from a database, the source data represented by star schema data; at operation 1420, receiving cube metadata from a metadata engine, the cube metadata including dimension and measures information for a cube; at operation 1430, building the cube based on the cube metadata and the source data, executing on at least one processor of a machine, by performing a multi-stage MapReduce job on the star schema data to produce a multi-dimensional cube lattice having multiple cuboids representing cube data; and at operation 1440 providing the cube data to a cube store.

FIG. 15 is a flow diagram illustrating a method 1500 for building a cube, according to another embodiment. The method 1500 may be implemented using the various embodiments shown in FIGS. 1-3, for example. In an example embodiment, the method 1500 includes: at operation 1510, performing at least one MapReduce job at each dimension in the multi-dimensional cube lattice to produce temporary HDFS sequence files; at operation 1520, performing at least one MapReduce job to transform each of the temporary HDFS sequence files into at least one HFile to create a plurality of HFiles representing the cube data of the multi-dimensional cube lattice; and at operation 1530 bulk uploading the plurality of HFiles into one or more HBase tables. In other example embodiments, bulk uploading each of the at least one HFiles corresponding to one of the temporary sequence file into a separate split region in the one or more HBase tables.

In an example embodiment, building the cube based on the cube metadata and the source data includes generating $N^2$ cuboids for a multi-dimensional cube lattice having N dimensions during the multi-stage MapReduce job having N+1 stages such that cuboids having N dimensions are generated at the first stage of N+1 stages, cuboids having N−1 dimensions are generated at the second stage of N+1 stages, and so forth until a zero-dimensional cuboid referred as the apex is generated at the last stage of the N+1 stages. In some embodiments, each stage in the multi-stage MapReduce job generates one or more cuboids having the same number of dimensions.

In other embodiments, building the cube based on the cube metadata and the source data includes mapping the cube to one or more cube tables in the cube store. In further embodiments building the cube based on the cube metadata and the source data includes transforming source HDFS files to HFiles for storage in a cube store. In various embodiments, creating, by the cube build engine, one or more HBase tables based on the cube metadata. In some embodiments, creating the one or more HBase tables having split regions.

In various embodiments, building the cube based on the cube metadata and the source data includes building a full materialization of the multi-dimensional cube lattice. In other example embodiments, building the cube based on the cube metadata and the source data includes building a cube representing partial data of the multi-dimensional cube lattice, the partial data including a subset of the cuboids in the multi-dimensional cube lattice. In yet further embodiments, building the cube based on the cube metadata and the source data includes building cuboids based high cardinality dimensions. In yet other embodiments, building the cube based on the cube metadata and the source data includes building cuboids which do not aggregate more than one high cardinality dimension. In another embodiment, building the cube based on the cube metadata and the source data includes building a cube representing partial data of the multi-dimensional cube lattice during build time. In some embodiments, building the cube based on the cube metadata and the source data includes aggregating one or more cubes representing partial data of the multi-dimensional cube lattice during run time in response to a query. Other embodiments for building the cube based on the cube metadata and the source data include incrementally building the cube from the source data partitioned into a plurality of time slot partitioned data. In alternative embodiments, building the cube based on the cube metadata and the source data includes aggregating the plurality of time slot partitioned data during runtime.

Example System Architecture

Figure 3:
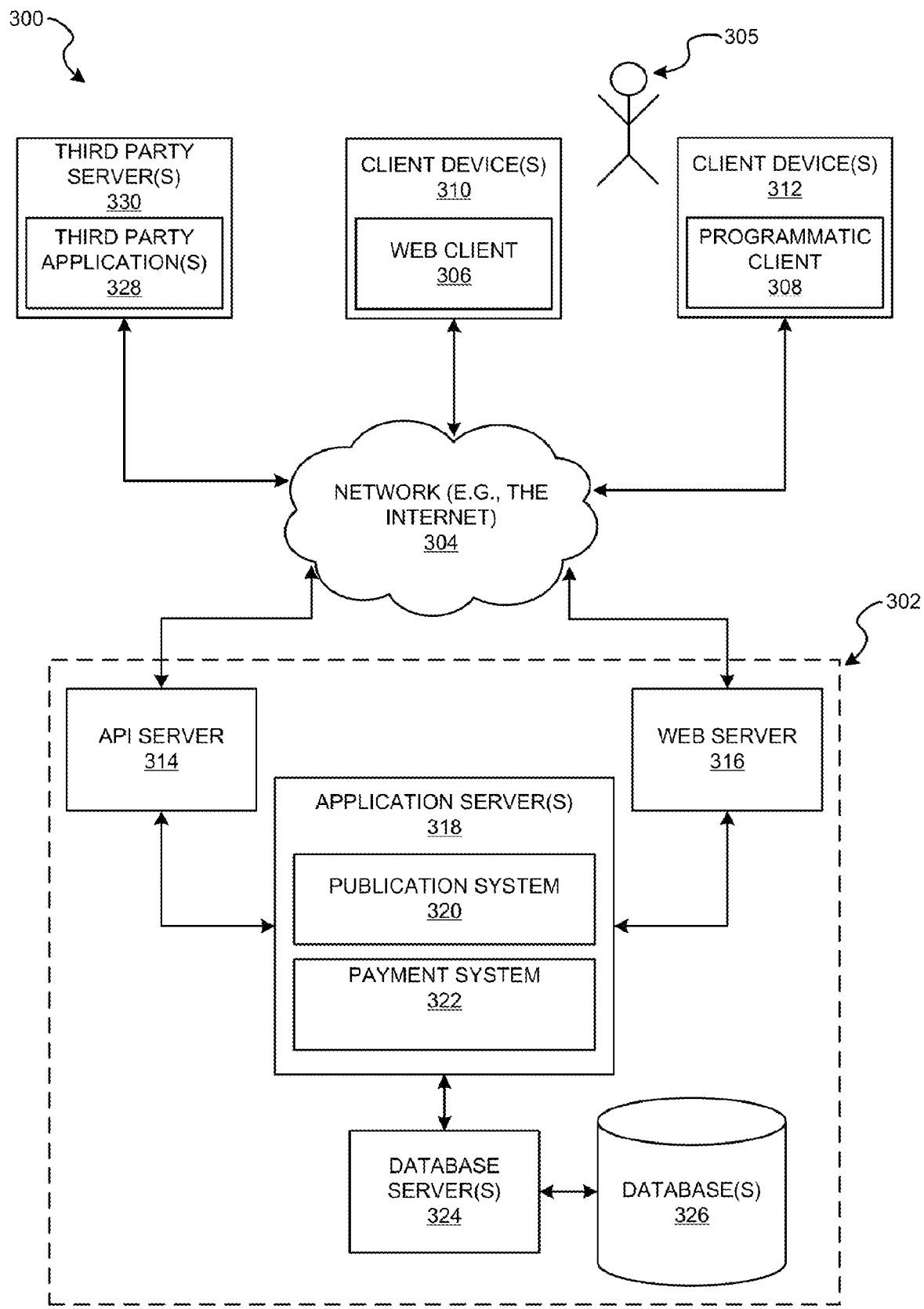
FIG. 3 illustrates an example embodiment of a high-level client-server-based network architecture for implementing a Hadoop OLAP system.

With reference to FIG. 3, shown is an example embodiment of a high-level client-server-based network architecture 300 which may be used to implement the Hadoop OLAP system 100. A networked system 302, in an example, provides network-server-side functionality, and is coupled via a communication network, (e.g., the Internet, wireless network, cellular network, or a Wide Area Network (WAN)) to one or more client devices 310 and 312. FIG. 3 illustrates, for example, a web client 306 operating via a browser (e.g., such as the INTERNET EXPLORER® browser developed by Microsoft® Corporation of Redmond, Washington State), and a programmatic client 308 executing on respective client devices 310 and 312.

The client devices 310 and 312 may comprise a mobile phone, wearable computing device, desktop computer, laptop, or any other device that a user, such as user 305 may utilize to access the networked system 302. Various applications may run on the client devices 310 and 312. For example, one or more applications from a publication system 320 and a payment system 322 may be accessible to the user 305 by having a corresponding application running on the client devices 310 and 312. Alternatively, the user 305 may access such applications from the client devices 310 and 312 through a web browser. In an example embodiment, BI Tools 185 (as shown in FIG. 2) may run on client devices 310 or 312. In further embodiments, $3^{rd}$ Party App 170 or SQL-Based Tool 180 (shown in FIG. 1) may run on client devices 310 or 312.

An API server 314 and a web server 316 are coupled to, and provide programmatic and web interfaces respectively to, one or more application servers 318. The application servers 318 may reside on server machines (not shown) that host the publication system 320 and the payment system 322, each of which may comprise one or more modules, applications, or engines, and each of which may be embodied as hardware, software, firmware, or any combination thereof. The application servers 318 are, in turn, coupled to one or more database servers 324 facilitating access to one or more information storage repositories or databases 326. The databases 326 may also store user account information of the networked system 302 in accordance with example embodiments.

The databases 326 may store data pertaining to various functions and aspects associated with the client-server-based network architecture 300 and its users. For example, user accounts for users of the networked system 302 may be stored and maintained in the databases 326. Each user account may comprise user data that describes aspects of a particular user, such as the user 305. The user data may include demographic data, user preferences, and financial information. In example embodiments, the databases 326 may represent databases within the Hadoop system 110 and the cube store 120, which may be used to store business information.

In example embodiments, the publication system 320 publishes content on a network (e.g., Internet). As such, the publication system 320 provides a number of publication functions and services to users that access the networked system 302. In example embodiments, the publication system 320 is discussed in terms of a marketplace environment. However, it is noted that the publication system 320 may be associated with a non-marketplace environment such as an informational or social networking environment. In further embodiments, the publication system 320 may be used in an analytics processing environment (e.g., OLAP), which may be used to provide business intelligence information.

The payment system 322 provides a number of payment services and functions to users. The payment system 322 allows users to accumulate value (e.g., in a commercial currency, such as the U.S. dollar, or a proprietary currency, such as "points") in their accounts, and then later to redeem the accumulated value for products (e.g., goods or services) that are made available via the publication system 320 or elsewhere on a network 304. The payment system 322 also facilitates payments from a payment mechanism (e.g., a bank account, PayPal™, or credit card) for purchases of items via any type and form of a network-based marketplace.

While the publication system 320 and the payment system 322 are shown in FIG. 3 to both form part of the networked system 302, it will be appreciated that, in alternative embodiments, the payment system 322 may form part of a payment service that is separate and distinct from the networked system 302. Additionally, while the example network architecture 300 of FIG. 3 employs a client-server architecture, a skilled artisan will recognize that the present disclosure is not limited to such architecture. The example network architecture 300 can equally well find application in, for example, a distributed or peer-to-peer architecture system, n-tier architecture, or virtualized cloud computing architecture. The publication system 320 and payment system 322 may also be implemented as standalone systems or standalone software programs operating under separate hardware platforms, which do not necessarily have networking capabilities.

Additionally, a third party application(s) 328, executing on a third party server(s) 330, is shown as having programmatic access to the networked system 302 via the programmatic interface provided by the API server 314. For example, the third party application 328, utilizing information retrieved from the networked system 302, may support one or more features or functions on a website hosted by the third party. The third party website may, for example, provide one or more promotional, marketplace, or payment functions that are supported by the relevant applications of the networked system 302.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 13:
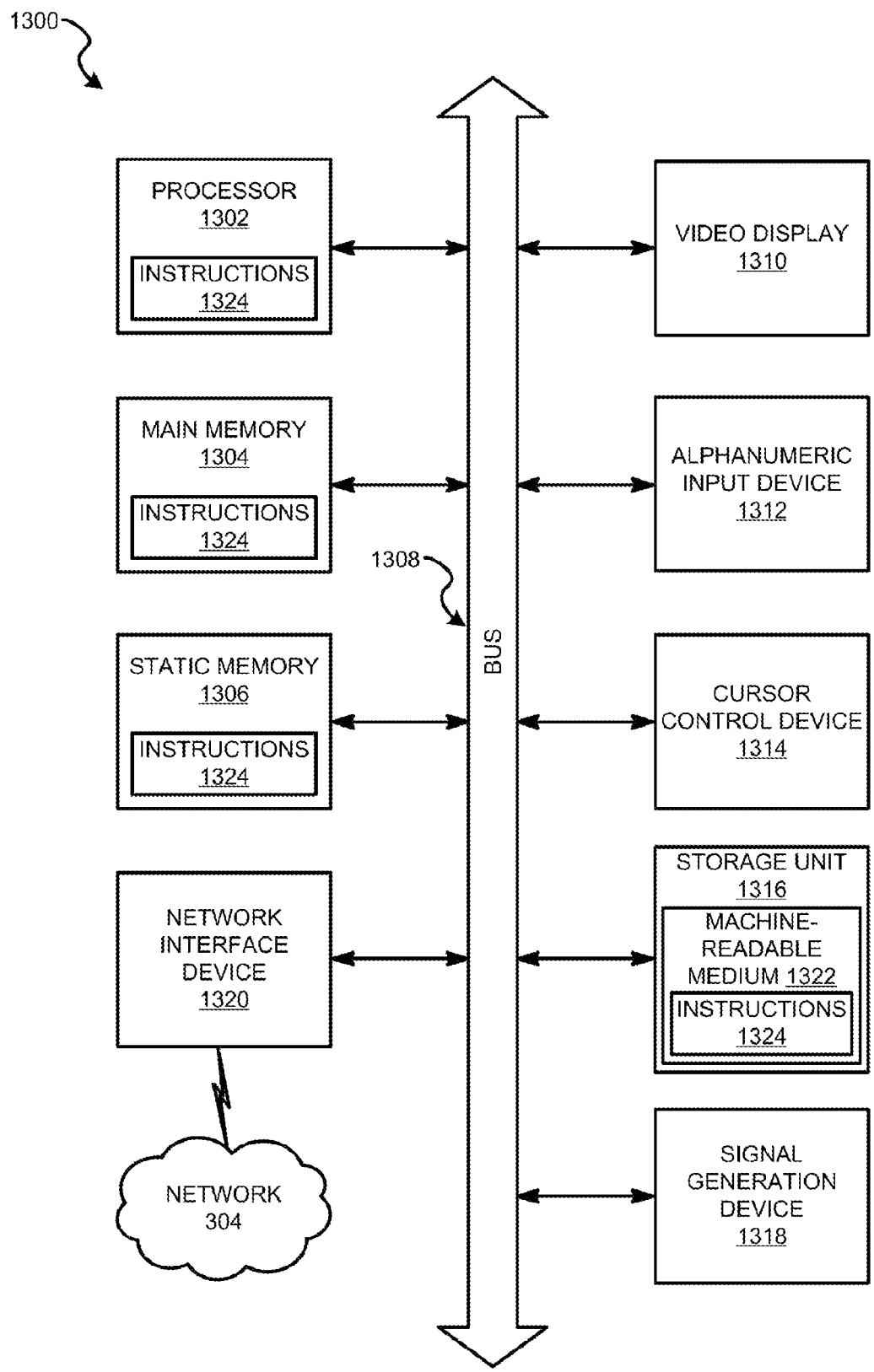
FIG. 13 illustrates an example embodiment of a computer system, according to one embodiment.

With reference to FIG. 13, an example embodiment extends to a machine in the example form of a computer system 1300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment or n-tier network, as a peer machine in a peer-to-peer (or distributed) network environment or in a virtualized cloud computing environment. The machine may be a personal computer (PC), wearable computing device, a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 may include a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). In example embodiments, the computer system 1300 also includes one or more of an alphanumeric input device 1312 (e.g., a keyboard), a user interface (UI) navigation device or cursor control device 1314 (e.g., a mouse), a storage unit 1316, a signal generation device 1318 (e.g., a speaker), and a network interface device 1320.

Machine-Readable Storage Medium

The storage unit 1316 includes a machine-readable storage medium 1322 on which is stored one or more sets of instructions 1324 and data structures (e.g., software instructions) embodying or used by any one or more of the methodologies or functions described herein. The instructions 1324 may also reside, completely or at least partially, within the main memory 1304, 1306, and 1316 or within the processor 1302 during execution thereof by the computer system 1300, with the main memory 1304 and the processor 1302 also constituting machine-readable media.

While the machine-readable storage medium 1322 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present embodiments, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc read-only memory (CD-ROM) and digital video disc read-only memory (DVD-ROM) disks.

Transmission Medium

The instructions 1324 may further be transmitted or received over a communications network 304 using a transmission medium via the network interface device 1320 and utilizing any one of a number of well-known transfer protocols (e.g., HTTP). Examples of communication networks include a local area network (LAN), a WAN, the Internet, mobile telephone networks, POTS networks, and wireless data networks (e.g., Wi-Fi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present embodiments as represented by the appended claims. The specification and drawings are, accordingly, to be regarded in an illustrative rather than a restrictive sense.

What is claimed is:

1. A method implemented by a Hadoop Online Analytical Processing (OLAP) engine, the method comprising:
    accessing a query history of a user to identify a query pattern;
    automatically identifying cube metadata based on the query pattern identified from the query history, wherein the cube metadata defines dimensions and measure information for a cube;
    receiving the cube metadata;
    building the cube based on the cube metadata and source data;
    storing the cube in one or more HBase tables of a cube store, the cube store configured for access by a query engine, and at least one HBase table being distributed over a plurality of servers;
    partitioning the cube stored in the cube store into a first data partition configured as a cube and a second data partition configured as a cube, the first data partition configured as a cube corresponding to a first time slot and the second data partition configured as a cube corresponding to a second time slot that represents a smaller amount of time than the first time slot; and
    refreshing the first data partition configured as a cube by periodically merging cube data in the second data partition configured as a cube with cube data in the first data partition configured as a cube.

2. The method of claim 1, wherein the cube serves as a cache.

3. The method of claim 1, wherein building the cube based on the cube metadata and the source data comprises transforming source Hadoop Distributed File System (HDFS) files to HFiles for storage in the cube store.

4. The method of claim 1, further comprising creating the one or more HBase tables based on the cube metadata.

5. The method of claim 1, wherein the cube is an Online Analytical Processing (OLAP) cube.

6. The method of claim 1, wherein the measure information includes any one of a sum, a count, a max, or a min function.

7. The method of claim 1, further comprising grouping columns of the one or more HBase tables into one or more column families and storing the columns of a column family together on a HDFS.

8. The method of claim 1, wherein the query engine is configured to query the cube data using SQL queries.

9. The method of claim 1, wherein the first data partition configured as a cube is refreshed by periodically merging the cube data in the second data partition that is configured as a cube and corresponds to the second time slot that represents the smaller amount of time than the first time slot with the cube data in the first data partition that is configured as a cube and corresponds to the first time slot.

10. The method of claim 1, wherein the first data partition configured as a cube is refreshed by periodically merging the cube data in the second data partition configured as a cube with the cube data in the first data partition configured as a cube, the first data partition configured as a cube corresponding to the first time slot, and the second data partition configured as a cube corresponding to the second time slot.

11. The method of claim 1, further comprising receiving SQL queries from the query engine and translating the SQL queries into cube store queries.

12. The method of claim 1, wherein cells of the one or more HBase tables are versioned.

13. A machine readable medium not having any transitory signals and storing instructions that, when executed by at least one processor of a machine, cause the machine implement a Hadoop Online Analytical Processing (OLAP) engine to perform operations comprising:
    accessing a query history of a user to identify a query pattern;
    automatically identifying cube metadata based on the query pattern identified from the query history, wherein the cube metadata defines dimensions and measure information for a cube;
    receiving the cube metadata;
    building the cube based on the cube metadata and source data;
    storing the cube in one or more HBase tables of a cube store, the cube store configured for access by a query engine, and at least one HBase table being distributed over a plurality of servers;

partitioning the cube stored in the cube store into a first data partition configured as a cube and a second data partition configured as a cube, the first data partition configured as a cube corresponding to a first time slot and the second data partition configured as a cube corresponding to a second time slot that represents a smaller amount of time than the first time slot; and refreshing the first data partition configured as a cube by periodically merging cube data in the second data partition configured as a cube with cube data in the first data partition configured as a cube.

14. The machine readable medium of claim 13, wherein the operations further comprise creating the one or more HBase tables based on the cube metadata.

15. The machine readable medium of claim 13, wherein the operations further comprise grouping columns of the one or more HBase tables into one or more column families and storing the columns of a column family together on a HDFS.

16. The machine readable medium of claim 13, wherein the query engine is configured to query the cube data using SQL queries and the Hadoop OLAP engine is further configured to translate the SQL queries into cube store queries.

17. A computer system, comprising:
at least one processor; and
a machine readable medium not having any transitory signals and storing instructions that, when executed by the at least one processor, cause the computer system to implement a Hadoop Online Analytical Processing (OLAP) engine perform operations comprising:
accessing a query history of a user to identify a query pattern;
automatically identifying cube metadata based on the query pattern identified from the query history, wherein the cube metadata defines dimensions and measure information for a cube;
receiving the cube metadata;
building the cube based on the cube metadata and source data;
storing the cube in one or more HBase tables of a cube store, the cube store configured for access by a query engine, and at least one HBase table being distributed over a plurality of servers;
partitioning the cube stored in the cube store into a first data partition configured as a cube and a second data partition configured as a cube, the first data partition configured as a cube corresponding to a first time slot and the second data partition configured as a cube corresponding to a second time slot that represents a smaller amount of time than the first time slot; and
refreshing the first data partition configured as a cube by periodically merging cube data in the second data partition configured as a cube with cube data in the first data partition configured as a cube.

18. The computer system of claim 17, wherein building the cube based on the cube metadata and the source data comprises transforming source Hadoop Distributed File System (HDFS) files to HFiles for storage in the cube store.

19. The computer system of claim 17, wherein the operations further comprise receiving SQL queries from the query engine and translating the SQL queries into cube store queries.

20. The computer system of claim 17, wherein the operations further comprise grouping columns of the one or more HBase tables into one or more column families and storing the columns of a column family together on a HDFS.

* * * * *